United States Patent [19]
Pompei et al.

[11] Patent Number: 5,653,239
[45] Date of Patent: Aug. 5, 1997

[54] CONTINUOUS TEMPERATURE MONITOR

[75] Inventors: Francesco Pompei; Janus Ternullo, both of Boston; William W. Malecki, Newton Corner, all of Mass.

[73] Assignee: Exergen Corporation, Watertown, Mass.

[21] Appl. No.: 524,853

[22] Filed: Sep. 7, 1995

Related U.S. Application Data

[62] Division of Ser. No. 281,766, Jul. 28, 1994, Pat. No. 5,469,855, which is a continuation of Ser. No. 60,486, May 11, 1993, abandoned, which is a continuation of Ser. No. 666,744, Mar. 8, 1991, abandoned.

[51] Int. Cl.⁶ .................................................. A61B 5/00
[52] U.S. Cl. ........................ 128/664; 128/736; 374/121
[58] Field of Search ........................ 128/736, 664; 606/109; 381/68, 68.6, 68.7; 181/130, 135, 137, 129; 374/128, 121, 129, 132, 133, 208

[56] References Cited

U.S. PATENT DOCUMENTS

| | | |
|---|---|---|
| 3,080,011 | 3/1963 | Henderson . |
| 3,156,117 | 11/1964 | Benzinger et al. . |
| 3,282,106 | 11/1966 | Barnes . |
| 3,491,596 | 1/1970 | Dean . |
| 3,581,570 | 6/1971 | Wertz . |
| 3,626,757 | 12/1971 | Benzinger . |
| 3,833,115 | 9/1974 | Schapker . |
| 3,878,836 | 4/1975 | Twentier . |
| 3,949,740 | 4/1976 | Twentier . |
| 4,191,197 | 3/1980 | Benzinger . |
| 4,380,998 | 4/1983 | Keiffer, III et al. . |
| 4,397,685 | 8/1983 | Brainard, II . |
| 4,537,187 | 8/1985 | Scott . |
| 4,567,881 | 2/1986 | Heller . |
| 4,582,053 | 4/1986 | Wilson . |
| 4,602,642 | 7/1986 | O'Hara et al. . |
| 4,797,840 | 1/1989 | Fraden . |
| 4,865,044 | 9/1989 | Wallace et al. . |
| 4,878,560 | 11/1989 | Scott . |
| 4,881,616 | 11/1989 | Janssen et al. . |
| 4,895,164 | 1/1990 | Wood . |
| 4,940,896 | 7/1990 | Hagins et al. ............ 250/338.3 |
| 4,993,419 | 2/1991 | Pompei . |
| 5,017,019 | 5/1991 | Pompei . |
| 5,046,580 | 9/1991 | Barton . |
| 5,088,834 | 2/1992 | Howe et al. . |
| 5,325,863 | 7/1994 | Pompei . |

*Primary Examiner*—Guy V. Tucker
*Attorney, Agent, or Firm*—Hamilton, Brook, Smith & Reynolds, P.C.

[57] ABSTRACT

Temperature of a subject is continuously monitored using a remote sensor assembly mounted in a subject's ear canal. The remote assembly connects to a display housing which contains the temperature display and supports electronics for responding to the sensed radiation. In one configuration, the major components of the remote assembly include a radiation detector, a plug structure and a flexible extension. The radiation detector has a thermopile and a first temperature sensor in close thermal contact with a thermopile junction. The flexible extension connects the radiation detector with the plug structure. Because the flexible extension bends to the contours of an ear canal, the remote sensor assembly extends well into a subject's ear canal without discomfort. The plug structure is molded to fit securely in the concha region of an ear canal and includes a second temperature sensor which senses the temperature therein. Continuous temperature measurements are determined by combining the sensed temperature for the thermopile and the first and second temperature sensors and converting this combined signal to a temperature indication. In another configuration, the remote sensor assembly has a radiation detector and an ear-piece shaped to fit behind the subject's ear. The ear-piece replaces the plug structure for this configuration and provides the same functions. The flexible extension connects the radiation detector and the ear-piece. A hollow adapter shaped to fit in the concha region of an ear is positioned over a portion of the extension. The position of the adapter on the extension may be varied such that the depth of penetration of the radiation detector into the ear canal is adjustable.

15 Claims, 15 Drawing Sheets

MAIN USE

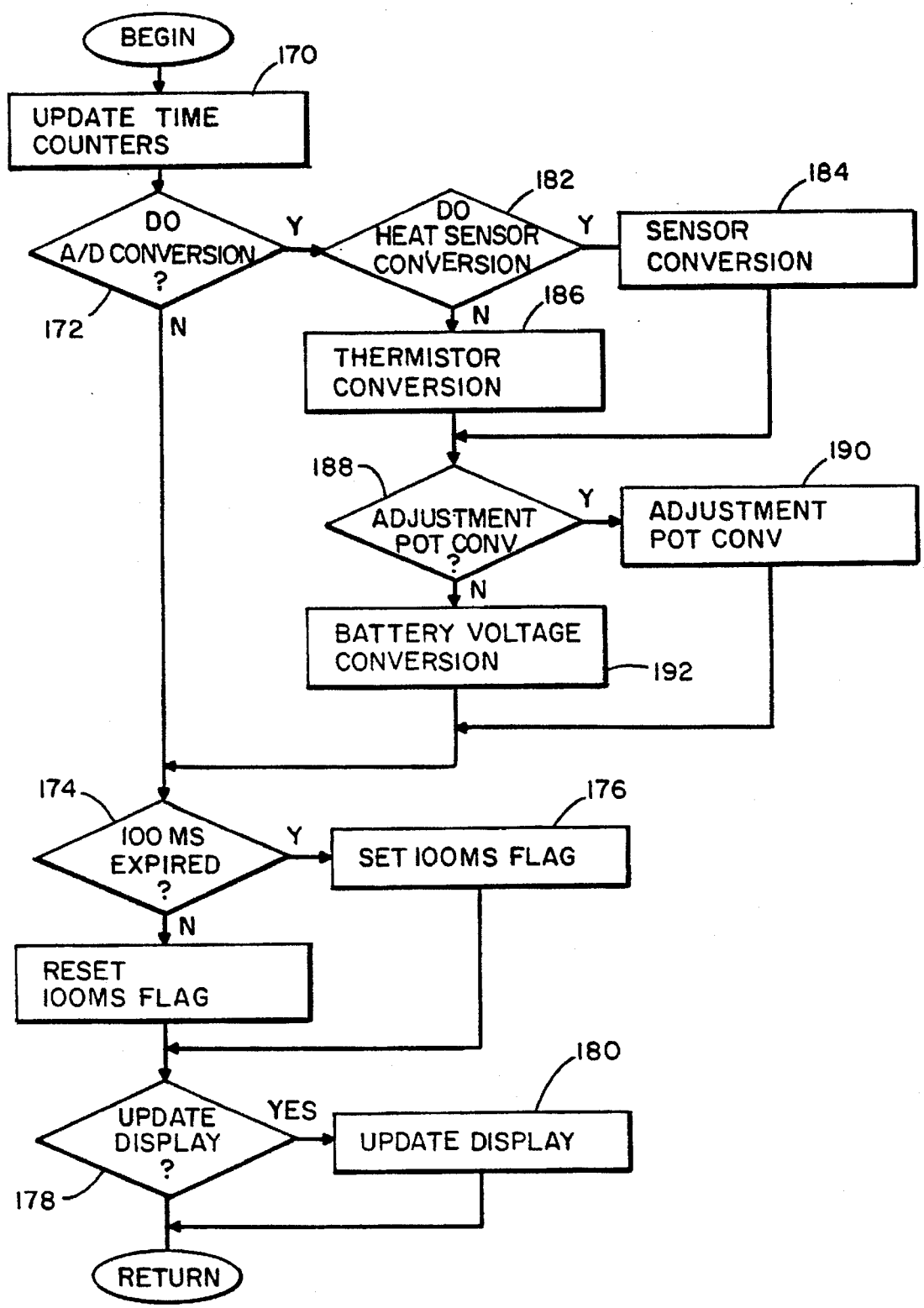
A/D CONVERSION INTERRUPT SERVICE ROUTINE FIG. 9B

SELF TEST

CONTINUOUS TEMPERATURE MONITOR

This application is a division of application Ser. No. 08/281,766 filed Jul. 28, 1994, now U.S. Pat. No. 5,469,855, which is File Wrapper continuation of 08/060,486 filed May 11, 1993, now abandoned, which is a File Wrapper continuation of 07/666,744 filed Mar. 8, 1991, now abandoned.

BACKGROUND

Non-contact temperature measurement devices using thermopile sensors to determine a subject's body temperature are a reliable alternative to traditional sublingual thermometers. These tympanic temperature devices obtain a measurement of the tympanic membrane in a subject's ear by the detection of infrared radiation. The tympanic membrane area is considered to provide a highly accurate representation of a subject's core temperature, and infrared temperature measurements using a thermopile are extremely rapid.

A hand-held radiation detector suitable for tympanic temperature measurement is illustrated in U.S. patent application Ser. No. 07/280,546. The detector obtains tympanic temperature measurements from the output of a thermopile mounted in an extension from a housing. The housing has a temperature display and supports the electronics for responding to sensed radiation from the tympanic membrane. The extension extends at about a fifteen degree angle from the housing and has the appearance of a conventional otoscope.

Another tympanic temperature measurement device is illustrated in U.S. Pat. No. 4,602,642 to O'Hara et al. This device comprises a probe unit having a handle and a head assembly terminating in a probe which is inserted into the external ear canal to take a subject's temperature. The head assembly contains an infrared sensitive thermopile detector for measuring radiation from the tympanic membrane. The probe unit is attached to a chopper unit by a cord, and both units must be physically mated between temperature readings for recalibration.

SUMMARY OF THE INVENTION

The present invention discloses various features of a continuous temperature monitor particularly suited for monitoring of ear canal temperature or tympanic temperature over an extended period of time. Examples include the continuous monitoring of a subject's body temperature during exposure to extreme environmental conditions or during physical exertion. Another example would be continuous monitoring of a patient's temperature in a hospital environment.

Existing tympanic temperature devices operate on the principle that the tympanic membrane must be within line-of-sight of the sensor. However, the tympanic membrane is not readily visible upon viewing a subject's ear because the human ear canal is curved. Thus, existing devices forcibly straighten a portion of the ear canal to view the tympanic membrane. Although the osseous section of the ear canal consists of inflexible bone, straightening is achieved on a portion of the ear canal near the concha which consists of soft, flexible cartilage. However, allowing existing devices to remain in a patient's ear for more than several seconds will often cause extreme discomfort.

In accordance with one embodiment of the present invention, a tympanic temperature monitor has a remote assembly comprising a radiation detector having thermopile mounted to view a tympanic membrane and a plug structure shaped to fit in the concha region of an ear. The remote sensor assembly fits comfortably in a subject's ear to allow for continuous monitoring. To that end, the remote assembly further comprises a flexible extension which deflects upon insertion into an ear canal to conform to the contours therein and connects the radiation detector with the plug structure.

A hollow, barbed anchor may surround a portion of the flexible extension adjacent to the plug structure. Once the remote sensor assembly is inserted, the anchor ensures that it will remain in the ear without backing out. Alternatively, an ear-clasp may be attached to the remote assembly to secure it within an ear canal. The ear-clasp is shaped to fit behind a subject's ear and has a clip which is secured over the ear to ensure that the remote assembly remains in the ear.

Depending on the subject being monitored, the flexible extension conforms to the natural shape of either an adult's ear canal or a child's ear canal. Given an adult subject, the flexible extension should be at least 8 mm in length in order that the radiation detector be located beyond the three-dimensional bend in a typical ear canal to provide a clear view of the tympanic membrane. The combined length of the radiation detector and the flexible extension is typically about 19 mm. Since an adult subject will usually experience discomfort if a device is inserted beyond 20 mm into the ear canal, the overall length of the sensor and flexible extension should be no more than 20 mm.

Alternatively, the aforementioned extension may be a semi-rigid structure which is preshaped to fit in an ear canal. However, some minimal distortion of the ear canal is required for this embodiment during insertion due to the natural curvature of the ear canal. Once inserted though, the preshaped semi-rigid extension fits comfortably in an ear canal.

A disposable element may be used over the remote sensor assembly. The element is sanitary and serves as a lubricant to aid insertion or removal of the assembly. The element also acts as a cushion for comfortable positioning of the assembly. The disposable element is a flat sheet of plastic, such as polyethylene, transparent to infrared radiation. The flat sheet is sufficiently stretchable to form a neat fit over the distal end of the remote sensor assembly.

A ring of soft, flexible material such as cotton may be attached to one side of the disposable element. When the disposable element is stretched over the remote sensor assembly, the ring is translated over the radiation detector and surrounds a portion of the flexible extension in close proximity to the aft edge of the radiation detector. The outer radius of the ring is preferably greater than the radius of the radiation detector, so a properly positioned ring provides additional comfort to the subject during insertion and removal of the remote assembly. Additionally, the ring minimizes discomfort to a subject when the radiation detector is oriented in the ear canal for the thermopile to view the tympanic membrane.

An adapter shaped to fit in the concha region of a subject's ear may be used with the disposable element (which also may have a ring attached thereto) to secure the remote sensor assembly in a subject having an uncommonly short ear canal such as a child. The adapter may be installed on the remote sensor assembly before or after the disposable element. In a preferred embodiment, the disposable element is first placed over the remote sensor assembly. The adapter is then translated along the plastic sheet over the length of the flexible extension and positioned adjacent to the plug structure. Since the adapter has a shape which resembles a hollow version of the plug structure, it is positioned to completely cover the distal end of the plug structure. Once it is in place, the adapter has sufficient thickness to reduce the length that the flexible extension extends into an ear canal. With a number of adapters with varying thickness available, a single remote sensor assembly may fit comfortably within any ear canal.

The preferred radiation detector of this invention comprises a tympanic temperature sensor which is smaller than existing devices in order to fit comfortably inside an ear canal for extended periods of time. To achieve a smaller sensor which equilibrates quickly to the surrounding environment, the traditional sensor can is not used and the gas-filled space within the sensor is reduced in size. Accordingly, the tympanic sensor detects tympanic radiation using a thermopile mounted to a film. The film is suspended across an opening in a pair of high thermal conductivity rings such as beryllium oxide. A window is mounted directly onto the first beryllium oxide ring. The reduced space located behind the window and defined by the rings is filled with air instead of low thermal conductivity xenon gas. A thermocouple for sensing the cold junction temperature of the thermopile is also mounted directly onto the first beryllium oxide ring. Instead of enclosing the tympanic sensor with a can, a thin layer of non-thermally conductive potting material covers the sensor body. A coating of silver paint is applied to the potting material to electrically shield the sensor, and a second thin layer of non-thermally conductive potting material covers the silver paint. By using non-thermally conductive potting material, the sensor is thermally isolated with respect to the external environment. Thus, the thermopile and the thermocouple will provide stable output voltages since the potting material protects both devices from thermal gradients within the ear canal.

In the preferred embodiments, the thermocouple is connected electrically in series with the thermopile such that the output voltages of the thermocouple and thermopile may be combined to produce a total output signal. The thermopile provides an output voltage indicative of the temperature differential between the tympanic membrane and the thermopile cold junction. The thermocouple has its hot junction thermally coupled to the cold junction of the thermopile via the first beryllium oxide ring. The cold junction of the thermocouple is thermally coupled to a reference mass of high thermal conductivity potting material located in the plug structure. Accordingly, the thermocouple provides an output voltage indicative of the temperature differential between the cold junction of the thermopile and the mass. Preferably, the temperature of the mass is monitored by an absolute temperature device such as a thermistor. Since the total output voltage of the thermopile and the thermocouple in series represents the difference in temperature between the tympanic membrane and an absolute temperature, the tympanic temperature can be determined.

The combined thermal mass of the thermopile and the thermocouple is relatively small, so the corresponding thermal capacitance is small. Since the thermal resistance of the thermopile and the thermocouple is also small due to the low thermal resistance of the beryllium oxide rings, the RC time constant for the two devices is small. In contrast, the entire tympanic sensor assembly has large thermal resistance, specifically between the thermopile cold junction and the external environment, due to the layers of non-thermally conductive potting material and the small electrical leads. Thus, the RC time constant of the entire tympanic sensor assembly is relatively large compared to the RC time constant for the thermopile in combination with the thermocouple. Consequently, after the sensor is inserted into an ear canal, the thermopile and the thermocouple can accurately track the tympanic temperature unaffected by thermal gradients in the ear canal.

The plug structure is made of a high thermal conductivity material and may contain an internal strip of thermal insulation material. The insulating material thermally isolates the distal portion of the plug structure from the portion containing the plug electronics. A mass of high thermal conductivity potting material comprising a preferred thermistor is located in the distal end of the plug structure. As stated previously, the thermistor determines the absolute temperature of distal portion of the plug structure. The cold junction of the thermocouple is thermally coupled to the thermistor and the mass of potting material which serves as a temperature reference for the thermocouple. Thus, the thermocouple cold junction temperature reference is remotely located with respect to the thermopile. The relatively large thermistor is not positioned in the radiation detector assembly, so size of the latter can be kept to a minimun for both comfort to a subject and speed of response.

The tympanic temperature monitor also comprises a housing which is connected to the remote assembly via a cable. The electronics located in the housing, combined with the aforementioned plug electronics in the remote sensor assembly, provide a continuous temperature readout on a display. Additionally, the housing electronics also provides on the display a continuous readout of the rate of change in tympanic temperature.

In another preferred embodiment of the present invention, an ear canal temperature monitor comprises a remote assembly having a radiation detector and an ear-piece shaped to fit behind a subject's ear. The ear-piece contains the electronics assembly contained in the plug structure of the other embodiment. In accordance with one feature of this embodiment, a clip located on the ear-piece prevents the remote assembly from backing out of a subject's ear during monitoring. The flexible extension connects the radiation detector and the ear-piece. A hollow adapter surrounds a portion of the flexible extension and is shaped to fit in the concha region of an ear. In accordance with another feature of this embodiment, the depth of penetration of the radiation detector into an ear canal is adjustable. More specifically, a stop ring is positioned on the flexible extension to secure the adapter and to prevent the extension from extending into the ear beyond an intended length.

BRIEF DESCRIPTION OF THE DRAWINGS

In the enclosed drawings like reference characters refer to the same parts throughout the different views. The drawings are not necessarily to scale, emphasis instead being placed upon illustrating the principles of the invention.

FIGS. 9A–C are flow charts of the system firmware.

DETAILED DESCRIPTION OF THE PREFERRED EMBODIMENTS

Figure 1A:
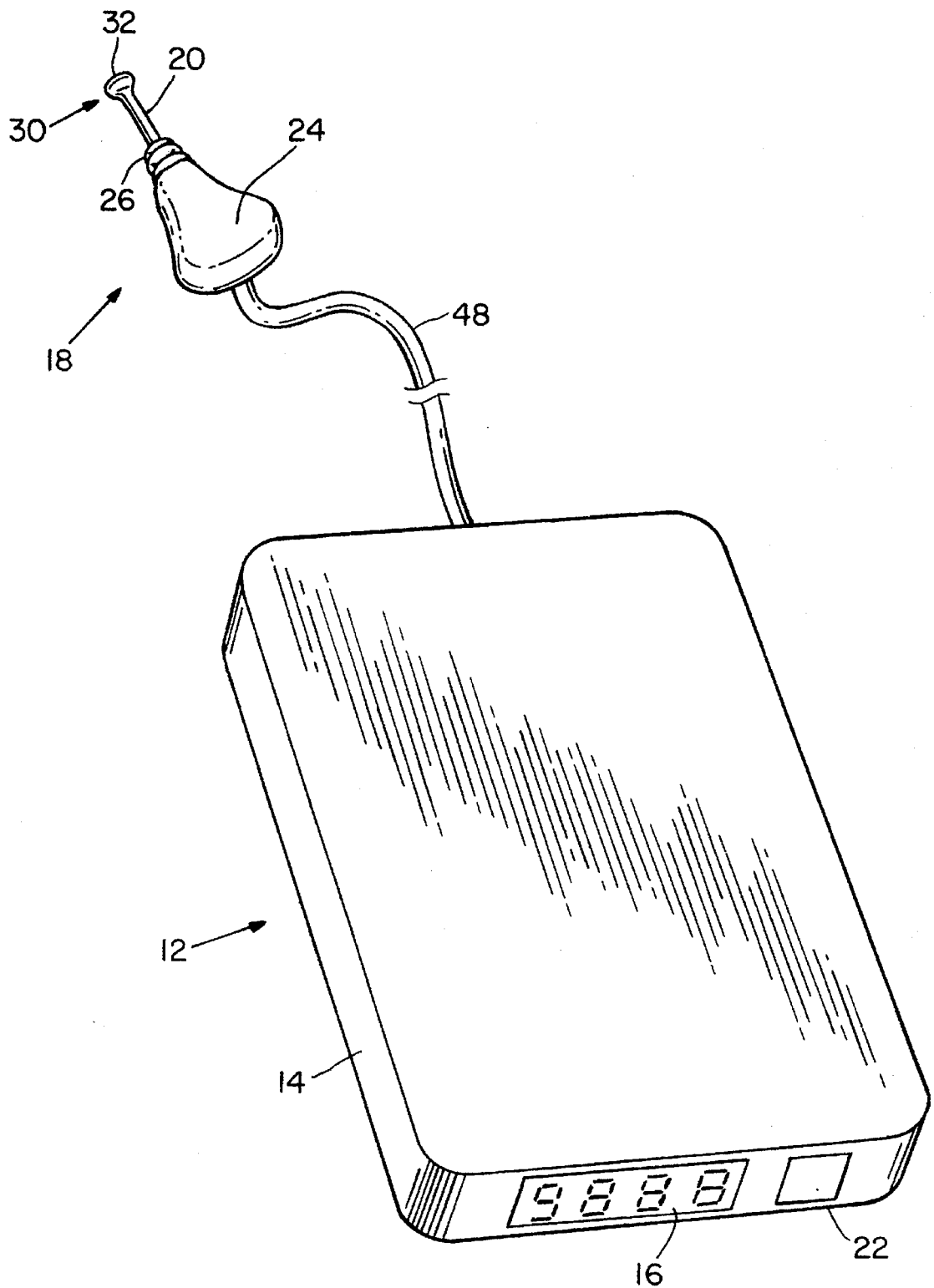
FIG. 1A illustrates a tympanic temperature monitor in accordance with the present invention.

The tympanic temperature monitor 12 of FIG. 1A includes a flat housing 14 with a digital display 16 for continuous display of a subject's tympanic temperature. In a preferred embodiment, the display 16 is a dual display which also provides for continuous display of the rate of change of tympanic temperature. The display may be located anywhere on the housing, although it is positioned on the end in the preferred embodiment. The instrument initially makes an accurate measurement of temperature when inserted into the ear canal and allows for continuous temperature monitoring without discomfort to the subject. A thermopile radiation sensor is contained within a remote assembly 18 which is connected to the housing 14 by a cable 48. The remote assembly 18 moves freely in space with respect to the housing 14 constrained only by the length of the cable 48. An on/off switch 22 is positioned on the housing.

A plug structure 24 is covered with a soft molded silicon material and tapered toward its distal end so that it may fit comfortably within the concha region of an ear. The plug structure 24 is connected to a temperature sensor 30 by a flexible extension 20. The flexible extension 20 bends to conform to the contours of the ear canal. Thus, the remote assembly 18 can be inserted into a subject's ear canal without discomfort, and it can rest comfortably in the ear canal for a considerable length of time.

A hollow rubber barbed anchor resembling an ear plug 26 may surround the portion of the flexible extension 20 adjacent to the plug structure 24. The plug structure prevents the remote assembly 18 from being inserted too far into the ear canal so as to cause discomfort and also contains electronics which provide signals to the housing that are manipulated to produce tympanic temperature measurements. Once the remote assembly 18 is inserted, the anchor 26 causes it to remain in the ear canal without backing out.

Figure 2A:
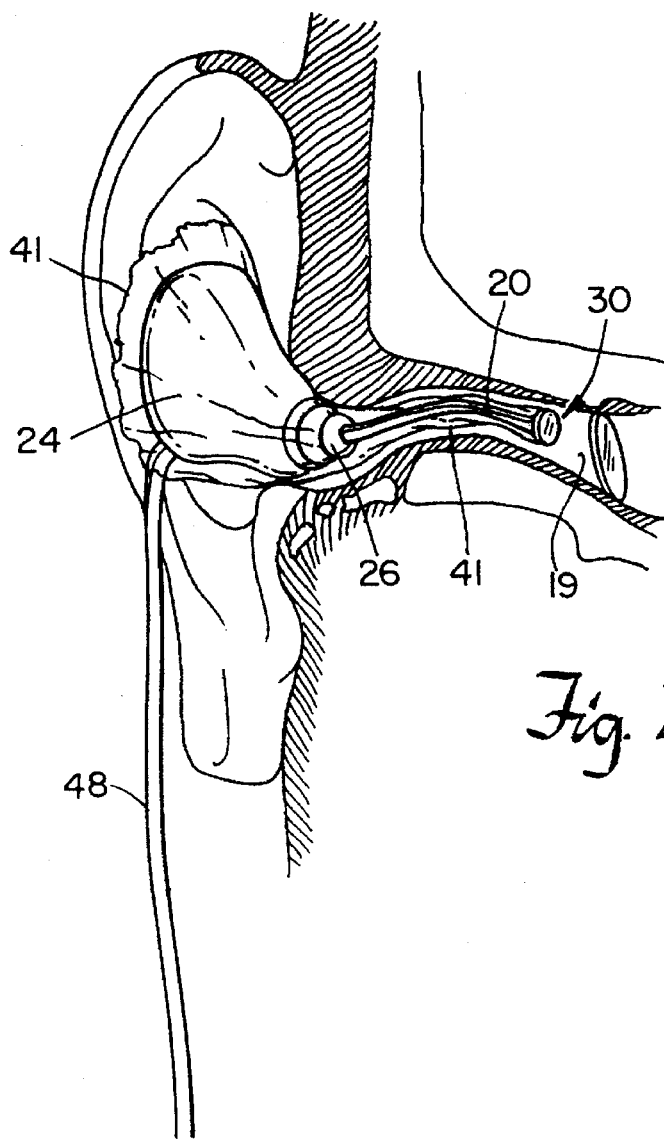
FIG. 2A is a view projected from three-dimensions of a human right ear canal with the remote assembly of FIG. 1A mounted therein.
Figure 3A:
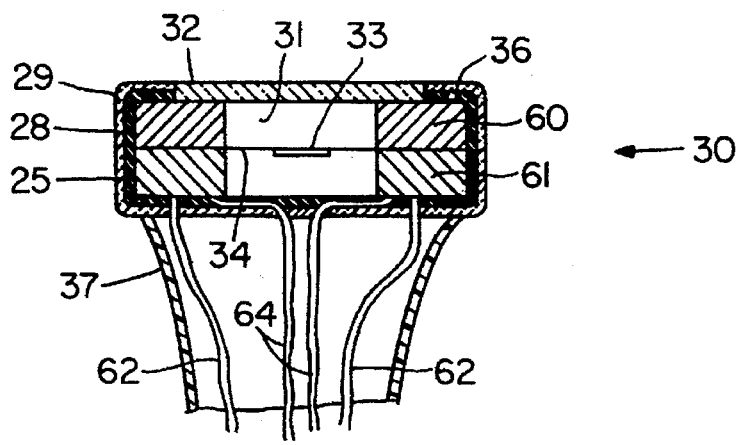
FIG. 3A is a cross-sectional view of the temperature sensor of FIGS. 1A and 1B.

As shown in FIG. 2A, the flexible extension 20 bends to the contours of an ear canal 19 so that the tympanic sensor 30 can remain in the ear canal for extended time periods without discomfort. In this embodiment, the flexible extension is a shielded cable which electrically connects the sensor 30 and the plug structure 24. In order to prevent a heat loss path through the flexible extension, high thermal impedance leads having small diameters are preferred. Additionally, the plug structure, which fits snugly in the concha region of a typical ear, ensures that the remote assembly cannot be inserted too far into a subject's ear canal. The plug structure is shaped to fit comfortably in the concha region so that the entire remote assembly can remain in a subject's ear canal for a long period of time without discomfort. Referring to FIGS. 2A and 3B, the hollow anchor 26 may surround a portion of the flexible extension adjacent to the plug structure. The anchor is composed of a soft rubber-like material and has barbed fins 27 extending from its main body. The barbed fins on the anchor further secure the entire remote assembly in a subject's ear.

In an alternative embodiment of the present invention, the flexible extension 20 is a semi-rigid structure which is preshaped to fit in an ear canal. Some distortion of an ear canal is required, however, to insert the sensor in this embodiment due to the three-dimensional curve in the ear canal.

An adult's ear canal 19 typically measures 24 millimeters (mm) in length from the concha to the tympanic membrane. Traveling from the concha inward, the first 8 mm of the canal walls are composed of cartilage while the remaining 16 mm, known as the osseous region, are composed primarily of bone. There is a three-dimensional curve known as an "S" bend, a curve that is projected as an "S" in each of two perpendicular planes, in the ear canal in the vicinity of the bone-cartilage interface. Existing devices forcibly straighten the cartilage portion of the "S" bend in the ear canal in order to sense tympanic radiation. The flexible extension, however, is at least 8 mm long so that the sensor is positioned beyond the bend in the osseous region of the ear canal with a clear view of the tympanic membrane. Since the ear canal retains its natural shape, the sensor may remain inside without discomfort for a considerable amount of time.

Although an ear canal is about 24 mm long, a subject may experience extreme discomfort if a device is inserted beyond 20 mm therein. However, more accurate tympanic temperature measurements are achieved by inserting a sensor as close to the tympanic membrane as possible. Accordingly, the overall length of the sensor and flexible extension is no more than 20 mm. The preferred embodiment is about 19 mm long which allows for continuous monitoring without discomfort and highly accurate tympanic temperature determinations. Alternatively, the flexible extension may have a shorter length so that the remote assembly fits comfortably in a child's ear with the sensor positioned to clearly view the tympanic membrane.

Figure 1B:
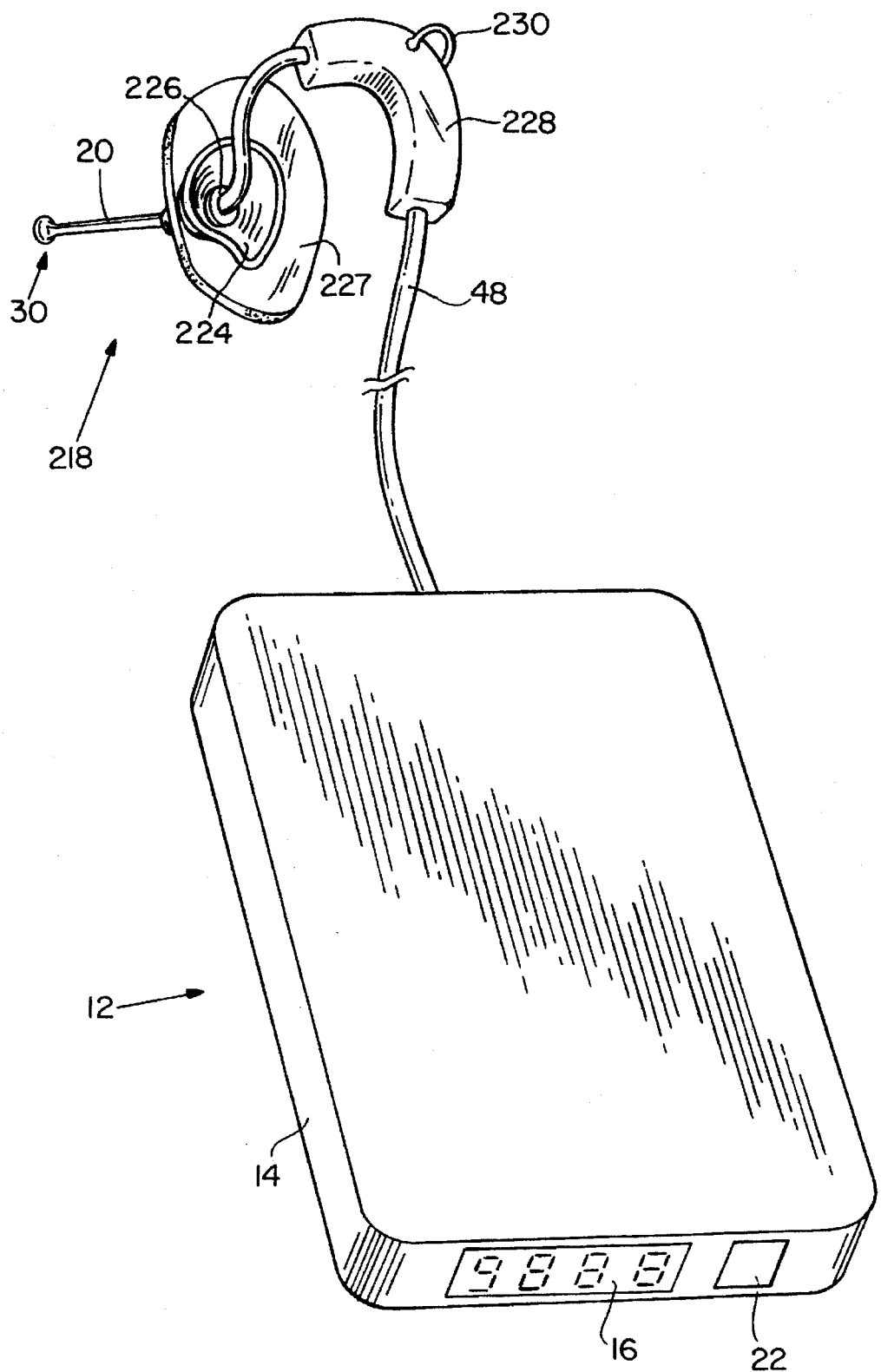
FIG. 1B illustrates an ear canal temperature monitor in accordance with another embodiment of the invention.

Another preferred embodiment of this invention comprises an ear canal temperature monitor as shown in FIG. 1B. In this embodiment, the remote assembly 218 comprises a radiation detector 30 and an ear-piece 228. The ear-piece is shaped to fit behind a subject's ear and comprises a clip 230. In accordance with one feature of this embodiment, the clip prevents the remote assembly from backing out of a subject's ear during monitoring. Also, the ear-piece 230 contains electronics which provide signals to the housing that are manipulated to produce tympanic temperature measurements. This embodiment further comprises a flexible extension 20 which connects the radiation detector and the ear-piece. Additionally, a hollow adapter 224 shaped to fit in the concha region of an ear surrounds a portion of the flexible extension.

In accordance with another feature of the ear canal temperature monitor, the adapter 224 may be positioned relative to the flexible extension so as to vary the length that the radiation detector 30 may be inserted into an ear canal. In other words, the depth of penetration of the radiation detector into an ear canal is adjustable. To that end, a stop ring 226 is positioned on the flexible extension to the secure the adapter 224 and to prevent the extension from extending into the ear beyond a specific length. The stop ring may be formed of aluminum and may be covered with rubber. The stop ring may be positioned anywhere along the flexible extension, so the depth of penetration into an ear canal preferably ranges from three to nineteen millimeters. Thus, a single remote sensor assembly 218 may be used to monitor subjects with any length ear canal ranging from children to adults.

The ear canal temperature monitor of FIG. 1B comprises two specific configurations each employing a shorter radiation detector to adapter distance as compared to other embodiment. An advantage of the two configurations is the added comfort to a conscious subject having the radiation detector in his ear, especially when the detector remains in the subject's ear for an extended period of time. These configurations may be achieved by positioning the stop ring along the flexible extension to limit the depth of penetration accordingly. In a first configuration, the stop ring is positioned such that the radiation detector to adapter distance is about 7-8 mm. As such, the detector is positioned on the exterior side of the "S" bend in an adult ear canal and does not sense the tympanic membrane directly. Instead, the detector senses the temperature of the ear canal adjacent to the "S" bend. In a second configuration, the stop ring is positioned such that the radiation detector to adapter distance is about 1-2 mm. Thus, the radiation detector is adjacent to the adapter and senses temperature at the outer portion of an ear canal.

The radiation detector is remotely positioned with respect to the tympanic membrane in these configurations, thermal equilibrium must be achieved within the entire ear canal before meaningful measurements are received. Thus, the response time in tracking tympanic temperature is longer. However, the added comfort to a conscious subject having the detector in his ear canal for extended periods of time offsets the slower response time.

In both configurations, the adapter is thermally insulated to prevent thermal losses from the ear canal. Both configurations rely on achieving thermal equilibrium within the ear canal (without directly viewing the tympanic membrane) to provide meaningful measurements, so it is important that thermal energy does not escape from the ear canal. To that end, insulation 227 is positioned around the adapter 224 in the concha region of a subject's ear. The insulation is preferably formed of cotton or foam and ensures that thermal energy is retained within the ear canal.

A preferred disposable element 41 (FIGS. 2A and 2B) may be used over the remote sensor assembly 18 serving as a lubricant which causes the remote assembly to more easily slide into or out of an ear canal. Although the disposable element may be used over the remote sensor assembly 218 of the ear canal temperature monitor, for simplicity of discussion purposes the disposable element is described herein with respect to the tympanic temperature monitor. The disposable element is a flat sheet of one-half mil stretchable plastic such as polyethylene which is transparent to infrared radiation. Although the flat sheet does not provide a close fit over the remote assembly 18, it is sufficiently stretchable to form a neat fit at the radiation detector end 30 of the extension and is sufficiently flexible to cause no discomfort to the subject when the remote assembly is in the ear canal. The disposable element was first presented by Applicant in U.S. patent application Ser. No. 07/280,546.

Figure 2B:
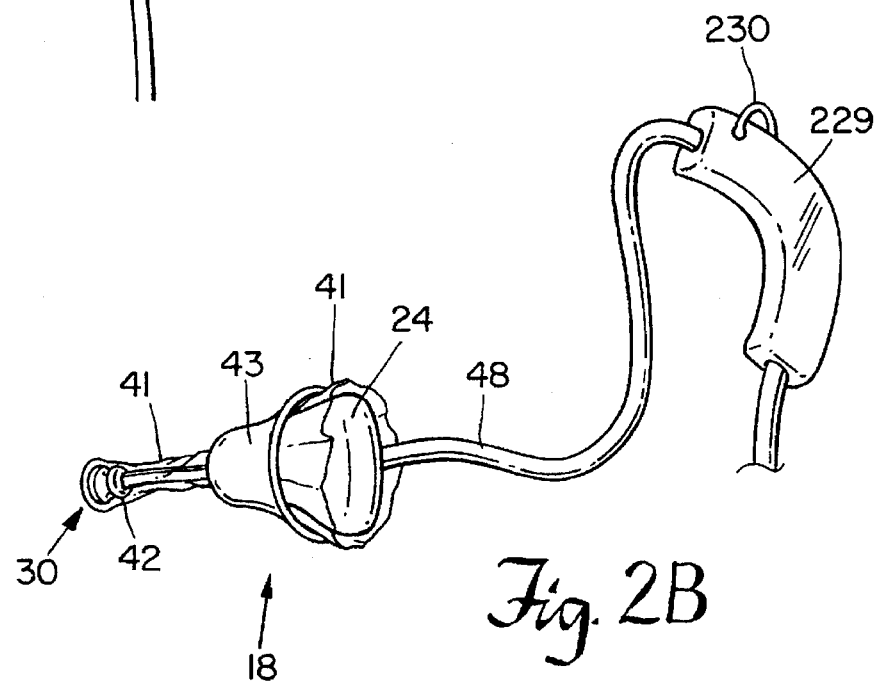
FIG. 2B illustrates the remote sensor assembly of FIG. 2A having a disposable element, an adapter and an ear-clasp.

A ring of soft, flexible material such as cotton may be attached to the disposable element 41. As shown in FIG. 2B, a ring 42 is attached to one side of the disposable sheet 41. When the disposable sheet 41 is stretched over the remote assembly 18, the ring is translated over the radiation detector 30 and surrounds a portion of the flexible extension 20 adjacent to the aft edge of the radiation detector. Preferably, the outer radius of the ring is greater than the radius of the radiation detector to provide a flexible surface adjacent to the inflexible aft edge of the radiation detector. Thus, a properly positioned ring 42 minimizes any potential discomfort due to the aft edge of the radiation detector contacting the inner ear canal during insertion or removal of the remote assembly or while being positioned to view the tympanic membrane.

A hollow adapter 43, also shown in FIG. 2B, shaped to fit in the concha region of the ear may be used to secure the remote sensor assembly in a subject having an uncommonly short ear canal. The adapter 43 may be used with the disposable element 41 and may be installed on the remote sensor assembly before or after the disposable element. In one embodiment, the disposable is stretched over the remote assembly 18 and the hollow adapter is placed over the plastic sheet at the radiation detector 30 and translated along the flexible extension 20. Since it has a shape resembling a hollowed-out version of a plug structure 24, the adapter may then be positioned to cover the distal end of the plug structure. The adapter has sufficient thickness to reduce the effective length that the flexible extension extends into an ear canal. By developing a number of adapters having varying thickness, the effective length of the flexible extension can be altered conform to any type of ear canal. Thus, a single remote assembly can be used to monitor the tympanic temperature for both adult and child subjects.

An ear-clasp 229 may be used in accordance with the present invention as shown in FIG. 2B. The ear-clasp is shaped to fit behind a subject's ear and has a clip 230 which is secured over the subject's ear. The function of the ear-clasp with the clip is to further prevent the remote assembly from backing out of the ear and to secure the position of the plug structure within the ear.

One of the goals of the present invention was to make the temperature sensor smaller than existing sensors so that it could fit comfortably within a subject's ear for a considerable length of time. Thus, in a preferred embodiment of FIG. 3A, the sensor can and the metal support structure of existing sensors are removed. A shortened beryllium oxide mass consists of two stacked rings 60 and 61 which are fastened together. Beryllium oxide is used because it is an electrical insulator as well as a good thermal conductor. A thermopile 33 is mounted on a polyester sheet 34 (sold under the trademark Mylar) which is suspended between the beryllium oxide rings.

Figure 3C:
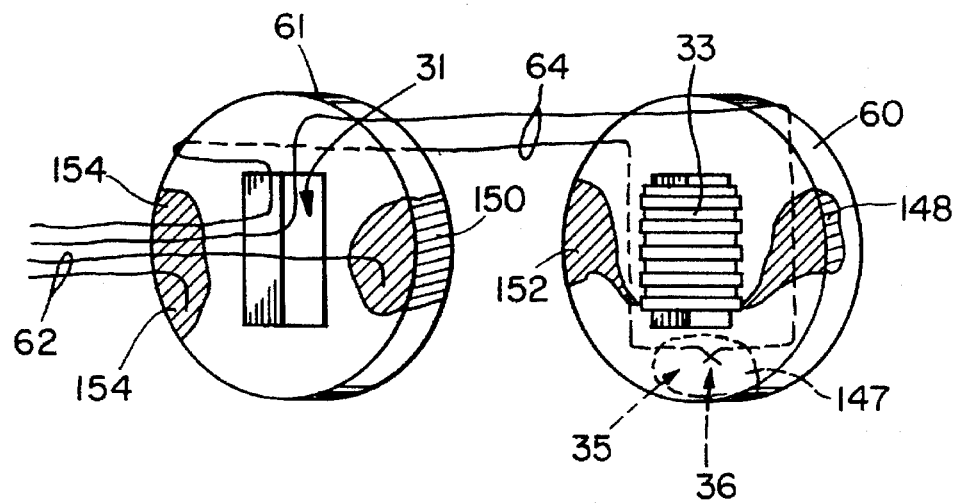
FIG. 3C is a perspective view of the beryllium oxide rings of the temperature sensor of FIG. 3A.
Figure 3B:
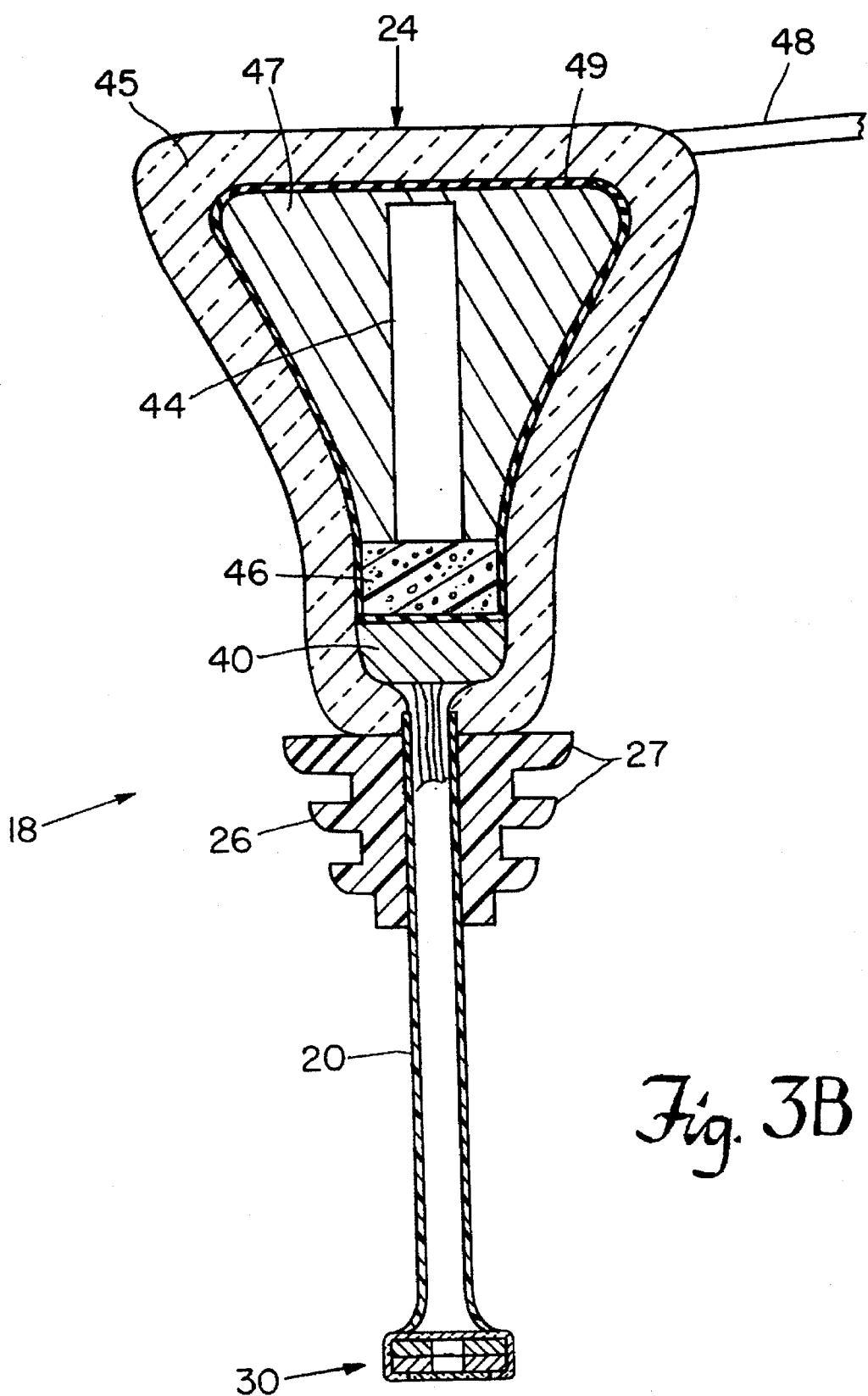
FIG. 3B is a cross-sectional view of the remote assembly of the remote sensor assembly of FIG. 1A.

Referring to FIG. 3C, a coated silicon window 32 is cemented directly onto the first beryllium oxide ring 60 with high thermal conductivity epoxy. The epoxy serves as a gas seal and provides mechanical support for the somewhat brittle coated silicon window. A reduced space 31 located behind the window and defined by the rings 60 and 61 is filled with air. A thermocouple 35 has a hot junction 36 attached to the first beryllium oxide ring 60 via silver paint 147 such that it is thermally coupled to the cold junction of the thermopile 33. Electrical contact with the thermocouple 35 is achieved via a pair of small diameter thermocouple leads 64.

Electrical contact with the thermopile is made using a conducting medium and leads 62 which are attached to the second beryllium oxide ring 61. As shown in FIG. 3C, silver paint serves as the conducting medium between the two rings 60 and 61. More specifically, a first trace 148 of silver paint is applied to ring 60 from a contact point on the thermopile hot junction to an edge of the first ring. Contact is made to the second ring 61 by a second trace 150 of silver paint at an edge of the second ring. Additionally, a third silver paint trace 152 is applied from a contact point on the therompile cold junction to an edge of the ring 60 opposite from the hot junction silver paint trace 148 such that the two paint traces do not cross each other. A fourth trace 154 provides electrical contact for thermopile cold junction between the two rings. Two small diameter leads 62 are attached to the third and fourth traces-(152, 154) on the second ring 61. The leads are electrically coupled to the plug electronics section 44 in the plug structure 24 (shown in FIG. 3B).

Returning to FIG. 3A, a thin layer of non-thermally conductive potting material 28 covers the sensor. A coating of silver paint 25 is applied to the potting material to electrically shield the sensor, and a second thin layer of non-thermally conductive potting material 29 covers the silver paint. In combination, the two layers of potting material provide a large thermal path resistance with respect to the external environment. Although the sensor assembly has a relatively small thermal mass corresponding to a small thermal capacitance, the RC time constant for the entire assembly is large compared to the RC time constant for the thermopile together with thermocouple. The combined thermal mass for the thermopile and the thermocouple is relatively small, so the corresponding thermal capacitance is small. The thermal resistance of the thermopile and the thermocouple is also small due to the low thermal resistance of the beryllium oxide rings, so the RC time constant for the two devices is small. Thus, the non-thermally conductive potting material effectively absorbs thermal gradients such that the stability of the thermopile and thermocouple output signals is unaffected by the thermal gradients. As a result, both devices are largely insensitive to thermal gradients within the ear canal and provide stable output voltages throughout the monitoring process.

Another important feature of the temperature sensor involves connecting the thermopile with the thermocouple electrically in series on the beryllium oxide structure. The thermopile 33 produces across its two end leads a voltage proportional to the temperature difference of a series of hot and cold junctions between its end leads. The output voltage for the thermopile ($E_p$) can be represented as:

$$E_p = c_p(T_1 - T_2) \quad (1)$$

where $T_1$=Hot junction temperature $T_2$=Cold junction temperature and $C_p$=Characteristic function of the thermopile.

The thermopile is selected such that $C_p$ is known. Further, over a limited temperature range $C_p$ may be represented as a constant and is treated as such for this analysis. Additionally, over a limited temperature range about an expected mean cold junction temperature, the target temperature ($T_t$) as seen by the thermopile is a linear function of the hot junction temperature ($T_2$). Consequently, $T_t$ may be treated as being linearly related to the output voltage for the thermopile ($E_p$) for the limited temperature range of interest. Then, equation (1) becomes:

$$E_p = C_x(T_t - T_2). \quad (2)$$

Since $T_t$ is proportional to $T_1$, $C_p$ has been replaced with $C_x$ to account for scaling factors inherent in the proportional relationship. The thermocouple 35 has its hot junction 36 coupled to the cold junction of the thermopile via a beryllium oxide structure. Beryllium oxide is preferred because it is a good thermal conductor and an electrical insulator. Thus, the cold junction temperature of the thermopile is identical to the hot junction temperature of the thermocouple. Further, the thermopile and the thermocouple are linked electrically in series in the plug structure electronics (described in more detail below). Then, the output voltage ($E_c$) for the thermocouple can be represented by the equation:

$$E_c = C_c(T_2 - T_r) \quad (3)$$

where $T_r$=Cold junction temperature of the thermocouple $C_c$=Characteristic function of the thermocouple.

The thermocouple is chosen such that $C_c$ is a known constant. Since the thermopile and thermocouple are connected electrically in series at the beryllium oxide structure and have approximately linear output voltage responses over the temperature range of interest, the total output voltage ($E_{pc}$) can be represented as a linear combination of $E_p$ and $E_c$ according to the following equation:

$$E_{pc} = E_p + E_c = C_x(T_t - T_2) + C_c(T_2 - T_r). \quad (4)$$

However, the thermocouple and the thermopile have been chosen for this analysis such that the magnitude of $C_c$ is much greater than the magnitude of $C_x$. Accordingly, the magnitude of $E_c$ is much greater than the magnitude of $E_p$ within the temperature range of interest. As such, changes in $E_p$ would then have a negligible effect on $E_{pc}$ whereas changes in $E_c$ would dominate. Thus, $C_c$ must be scaled so that $E_p$ and $E_c$ contribute nearly equally to $E_{pc}$. To accomplish this, $C_c$ is adjusted using a scale factor (K) whereby $$(K)C_c = C_x.$$

Preferably, K corresponds to a resistive network coupled to the thermocouple lead ends in the plug structure and which is described below. By scaling $E_c$ using K, equation (4) becomes $$E_{pc} = C_x(T_t - T_r). \quad (5)$$

This configuration allows for combining the output voltages of the thermopile and thermocouple to produce a total output voltage for the sensor.

Proper selection of the thermopile characteristic function $C_p$, the thermocouple characteristic function $C_c$ and the scale factor (K) produces a total output voltage for the sensor which is independent of fluctuations in $T_2$ as shown in equation (5). This feature was presented by Applicant in U.S. patent application Ser. No. 07/561,169 and is described therein. In that application the scale factor is employed to adjust the thermopile characteristic function. Otherwise, the concept is in accordance with the concept explained herein.

Referring to FIG. 3B, the plug structure 24 has an outer covering of soft, molded silicon 45 and an internal strip of foam insulation 46. The foam insulation 46 thermally isolates the distal portion of the plug structure from the portion containing the plug electronics section 44. The silicon covering 45 is a thermal insulator which ensures that a relatively uniform temperature is maintained within the each of the two isolated regions. Within the aft section of the plug structure, a plug electronics assembly comprising the plug electronics section 44 and potting material 47 is surrounded by an electrical shield 49. The potting material 47 is thermally conductive to ensure that the temperature across the electronics section 44 is uniform, so temperature gradients which can cause errors in the electrical signal are minimized.

Figure 4:
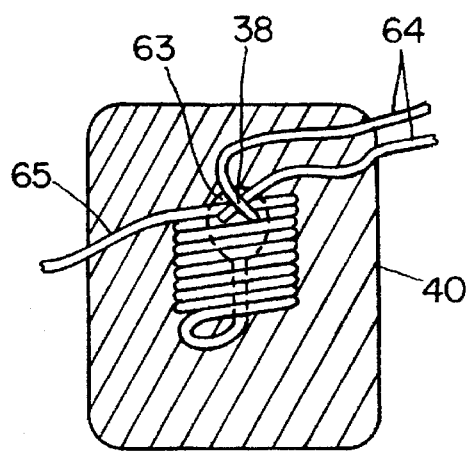
FIG. 4 illustrates the mass of thermally conductive potting material located in the plug structure of the remote sensor assembly of FIG. 3B.

As shown in FIG. 4, a preferred thermistor 63 is embedded with the thermocouple cold junction in a mass of high thermal conductivity material 40 located in the distal end of the plug structure. The thermistor senses the absolute temperature of the mass 40 and provides a variable resistive output ($R_a$) proportional to the sensed temperature. The resistance $R_a$ is coupled, via the plug electronics assembly 44, to the electronics in the housing unit 12 via a thermistor cable 65. The cable 65 comprises a pair of wires and is coiled around the thermistor TR1.

One feature of the coiled cable is that it provides additional thermal mass adjacent to the thermistor which translates into an increased thermal capacitance about TR1 which decreases the rate of change of temperature at the thermistor. A slowly changing temperature at the thermistor results in a relatively stable sensed temperature. To eliminate any magnetic field effects due to the looped coil configuration, the cable is wrapped around the thermistor an equal number of times in opposite cylindrical directions.

Another important feature of the coiled cable is that it prevents temperature gradients from traveling up the wire inside the cable and directly affecting the thermistor. The wire within the cable, which is coupled to circuitry residing at room ambient temperature, is actually a better thermal conductor than the epoxy mass. During operation, Thus, temperature gradients between the thermistor and the circiutry appearing at the external end of the wire would therefore bypass the capacitance of the epoxy mass and couple directly into the thermistor. By coiling the cable 65 around the thermistor, temperature gradients are severely attenuated along the length of the cable and do not affect the thermistor.

The thermocouple has a cold junction 38 which is physically coupled to the thermistor with thermally conductive epoxy. Since both devices are embedded in the thermally conductive mass 40, the cold junction of the thermocouple is thermally coupled to the thermistor 63. Thus, the temperature of the mass 40, which is measured by the thermistor 63, also corresponds to the cold junction temperature reference for the thermocouple ($T_r$). As a result, the tympanic temperature of a subject is determined by converting the total output voltage ($E_{pc}$) of the sensor with reference to a measured $T_r$.

Figure 5A:
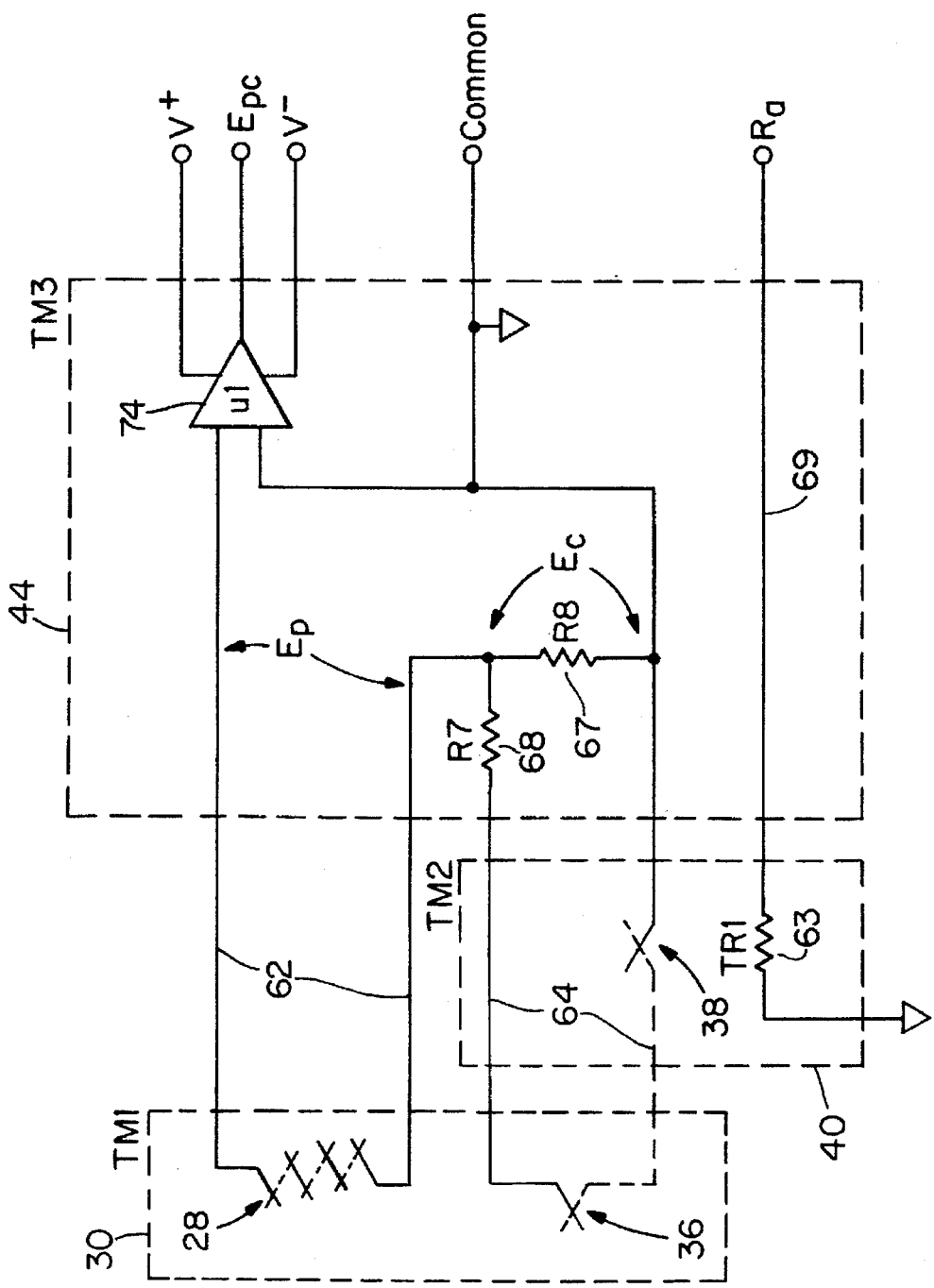
FIG. 5A is a schematic representation of the electronic circuitry of the remote sensor assembly of FIGS. 1A and 1B.

A schematic representation of the electronics of the remote sensor assembly is shown in FIG. 5A. Recall, the thermopile cold junction and the thermocouple hot junction are thermally coupled at the sensor 30 (TM1). The thermocouple cold junction 38 and TR1 are thermally coupled at the distal end of the plug (TM2).

As shown in FIG. 5A, the thermopile and thermocouple are connected electrically in series. To combine the two outputs, the thermocouple output voltage $E_c$ is adjusted using a scaling factor K. In a preferred embodiment, K comprises a pair of resistors R7 and R8 which are located in the electronics section 44 of the plug structure 24. The thermopile output voltage ($E_p$) and the adjusted thermocouple output voltage ($E_c$) are combined in a preamplifier 74 located in the plug electronics section 44. The two signals travel through the flexible extension along low impedance wires. But, the combined source impedance of the two sensors is high and the signal wire into the preamplifier is high impedance. Thus, the signal paths have a high overall impedance characteristic making the paths susceptible to electrical interference particularly with respect to signal size. Therefore, the conductive signal path lengths are kept to a minimum. The signals are combined and amplified by the preamplifier 74 which provides an output $E_{cp}$. In the previous analysis, $T_r$ was assumed constant for simplicity of discussion purposes. In the preferred embodiment, however, $T_r$ may vary. Thus, $T_r$ is monitored by the thermistor 63 which provides a resistance $R_a$ on line 69 proportional to the temperature of the mass 40.

In a preferred embodiment, the present invention monitors the tympanic temperature in a subject's ear using a remote sensor assembly 30 having sensor comprising a thermopile mounted to view the tympanic membrane. One junction of a thermocouple is thermally coupled to one junction of the thermopile. The thermocouple is used to keep the sensor small enough to remain in a subject's ear for an extended period of time. Additionally, the thermocouple is connected electrically in series with the thermopile such that the output voltages of the thermopile and thermocouple may be combined to provide a total output voltage for the sensor. The total output voltage of the sensor is amplified in the plug electronics to provide the housing electronics with a sufficient signal level for manipulation. The other junction of the thermocouple is thermally coupled to a thermistor which is located in the plug structure. The relatively large thermistor is remotely located with respect to the sensor to maintain a small sensor and serves as a temperature reference for the thermocouple. The temperature reference is converted to a voltage in the housing electronics unit and is combined with the total output voltage of the sensor. The resulting voltage is converted to a typmanic temperature value.

Figure 6A:
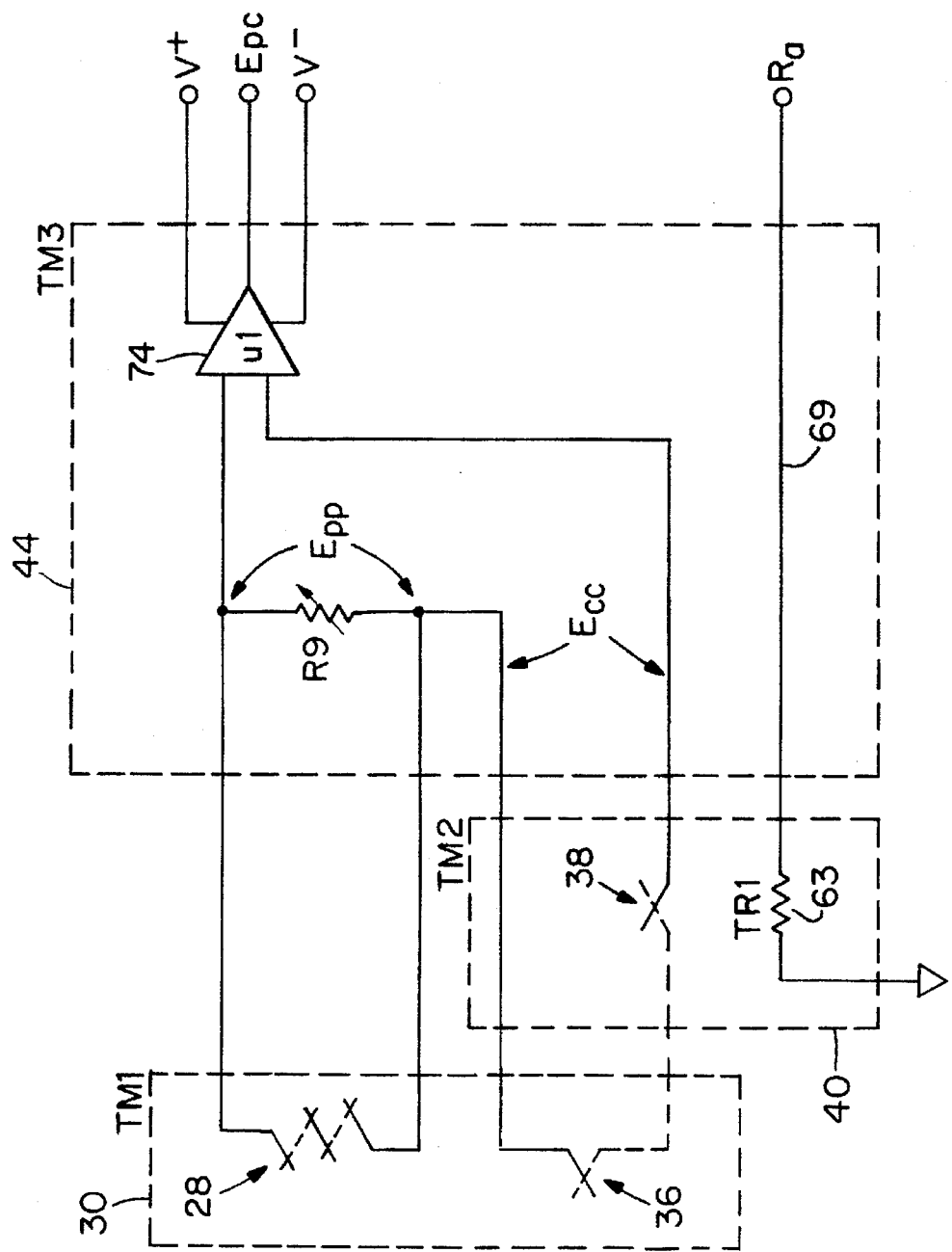
FIG. 6A is a schematic representation of an alternative configuration of the remote sensor assembly electronics of FIG. 5A.

In an alternative embodiment of the remote sensor assembly electronics, the thermopile output voltage ($E_{pp}$) is greater than the thermocouple output voltage ($E_{cc}$). As shown in FIG. 6A, $E_{pp}$ must be scaled to be combined with $E_{cc}$ to produce the total output voltage of the sensor. To that end, a variable resistor R9 is used to scale $E_{pp}$. The scaled $E_{pp}$ and $E_{cc}$ are combined and amplified in the preamplifier 74 located in the plug electronics assembly 44. The preamplifier output signal $E_{pc}$ is sent to the housing electronics for further manipulation. The thermocouple cold junction reference temperature is monitored by the thermistor 63 which provides a resistance $R_a$ on line 69 proportional to the temperature of the mass 40.

Figure 6B:
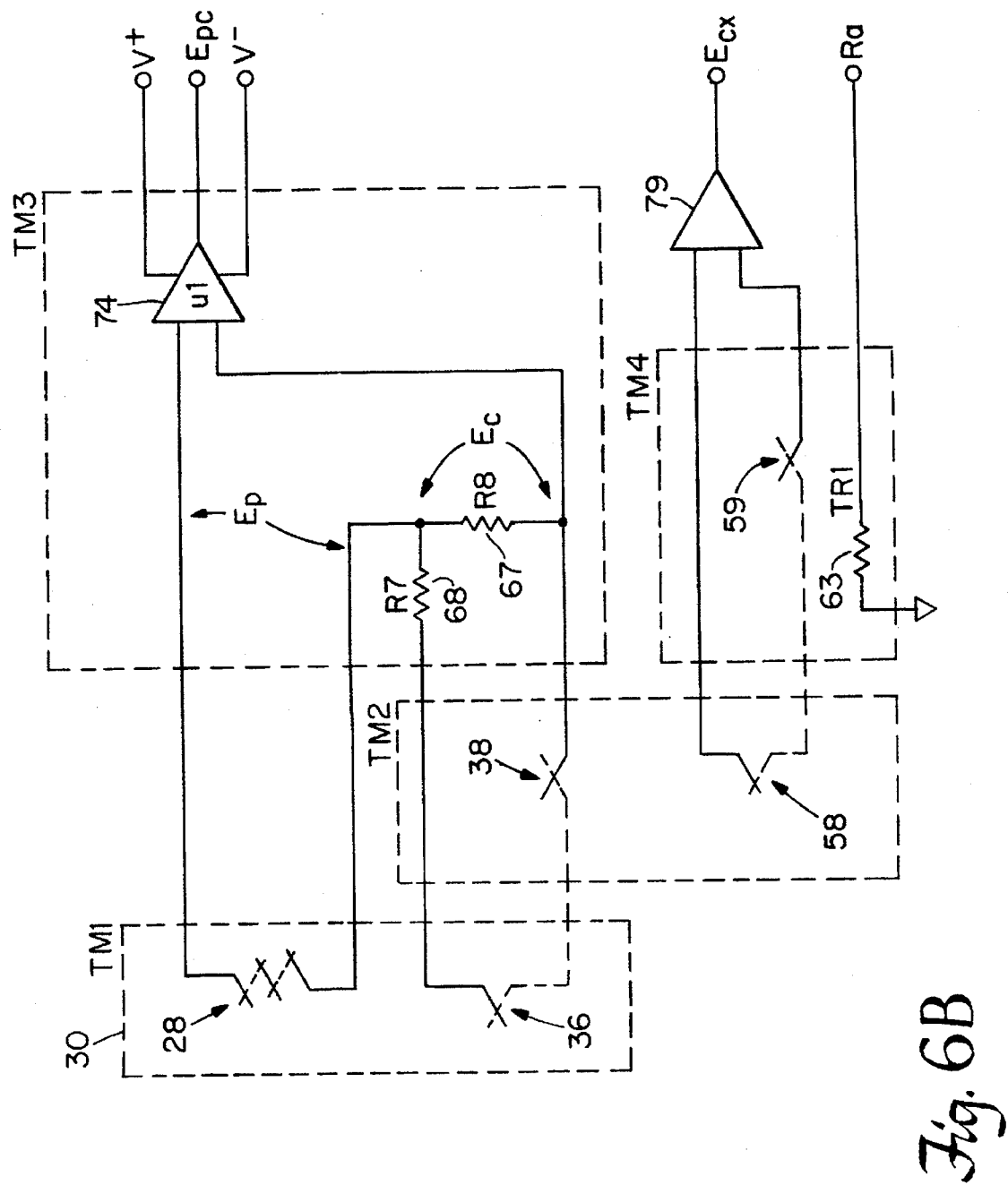
FIG. 6B is a schematic representation of another alternative configuration of the remote sensor assembly electronics of FIG. 5A.

In yet another embodiment of the remote assembly electronics, additional thermocouples may be daisy-chained before reaching an absolute temperature sensor. A schematic representation of one daisy-chain implementation is shown in FIG. 6B. The total output voltage $E_{pc}$ for the sensor is determined by combining the thermopile output voltage $E_p$ and the thermocouple output voltage $E_c$ as previously explained in the preferred embodiment. However, a second thermocouple having a hot junction 58 is thermally coupled to the cold junction 38 of the first thermocouple. The cold junction 59 of the second thermocouple is thermally coupled to a thermistor TR1 (63). The second thermocouple generates a voltage output corresponding to the temperature difference between the two thermal zones TM2 and TM4. An amplifier 79 amplifies the second thermocouple output voltage $E_{cx}$. The thermistor 63 generates a resisitive output Ra corresponding to the temperature of TM4. For this embodiment, the tympanic temperature is found by manipulating $E_{pc}$, $E_{cx}$ and $R_a$ in the housing electronics.

Figure 5B:
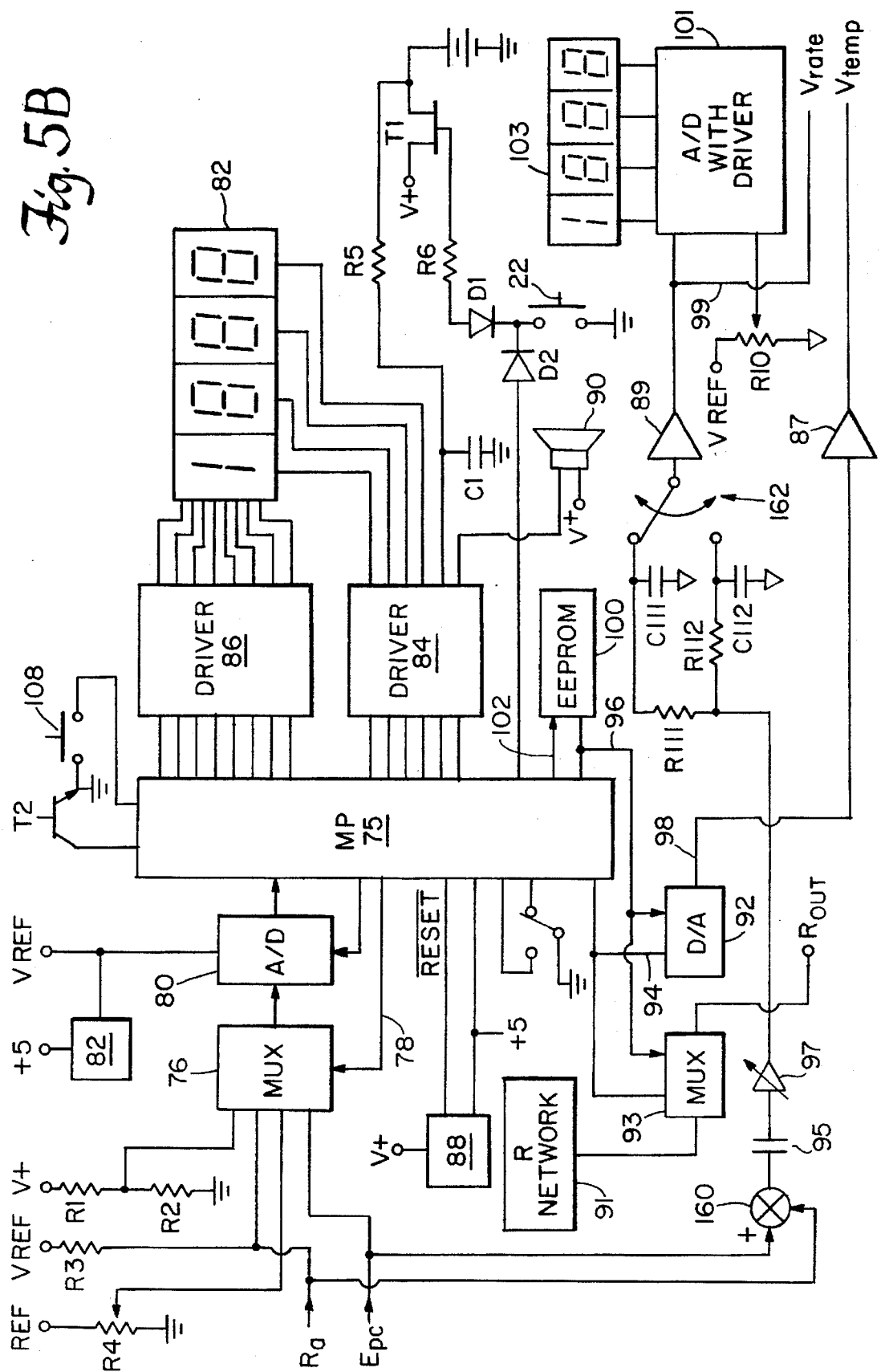
FIG. 5B is a block diagram of the electronic circuitry of the housing unit of FIGS. 1A and 1B.

A schematic illustration of the preferred electronics located in the housing 14, which combines with the plug electronics 44 to provide a continuous temperature readout on display 16 in response to a signal from the thermopile, is presented in FIG. 5B. The system is based on a microprocessor 75 which processes software routines included in read only memory within the processor chip. The processor may be a 6805 processor sold by Motorola.

The analog output voltage $E_{pc}$ from the amplifier 74 is applied as one input to a multiplexer 76. Another input to the multiplexer 76 is a voltage which is controlled by $R_a$ from the thermistor 63. The thermistor is coupled in a voltage divider circuit with R3 across a reference potential VREF, and the voltage across $R_a$ corresponds to $T_r$. A third input to the multiplexer 76 is a voltage taken from a voltage divider R1, R2 which is indicative of the potential V+ from the battery (power supply). The final input to the multiplexer is a potential taken from a potentiometer R4 which may be adjusted by a user. The system may be programmed to respond to that input in any of a number of ways. In particular, the potentiometer may be used as a gain control or as a DC offset control.

At any time during the software routine of the microprocessor 75, one of the four inputs may be selected by the select lines 78. The selected analog signal is applied to a multiple slope analog subsystem 80 used by the microprocessor in an integrating analog-to-digital conversion 80. The subsystem 80 may be a TSC500A sold by Teledyne. It utilizes the reference voltage VRef from a reference source 82. The microprocessor 75 responds to the output from the converter 80 to generate a count indicative of the analog input to the converter.

The microprocessor drives four 7-segment LED displays 82 in a multiplexed fashion. Individual displays are selected sequentially through a column driver 84, and within each selected display the seven segments are controlled through segment drivers 86.

When the switch 22 on the housing is pressed, it closes the circuit from the battery through resistors R5 and R6 and diode D1 to ground. The capacitor C1 is quickly charged, and field effect transistor T1 is turned on. Through transistor T1, the V+ potential from the battery is applied to a voltage regulator 88. The regulator 88 provides the regulated +5 volts to the system. It also provides a reset signal to the microprocessor. The reset signal is low until the +5 volt reference is available and thus holds the microprocessor 75 in a reset state. When the +5 volts is available, the reset signal goes high, and the microprocessor begins its programmed routine.

When the switch 22 is released, it opens its circuit, but a charge is maintained on capacitor C1 to keep transistor T1 on. Thus, the system continues to operate. However, the capacitor C1 and transistor T1 provide a very simple watchdog circuit. Periodically, the microprocessor applies a signal through driver 84 to the capacitor C1 to recharge the capacitor and thus keep the transistor T1 on. If the microprocessor should fail to continue its programmed routine, it fails to charge the capacitor C1 within a predetermined time during which the charge on C1 leaks to a level at which transistor T1 turns off. Thus, the microprocessor must continue in its programmed routine or the system shuts down. This prevents spurious readings when the processor is not operating properly.

With transistor T1 on, the switch 22 can be used as an input through diode D2 to the microprocessor to initiate any programmed action of the processor.

In addition to the display, the system has a sound output 90 which is driven through the driver 84 by the microprocessor.

A resistor network 91 is used to provide a resistance output corresponding to a standard thermistor value based on the measured temperature. A multiplexer 93 is used to control the resistor network output. When selected by line 94, the multiplexer receives serial data from line 96 and switches resistor paths in the network to provide a resistance corresponding to a standard thermistor value of the measured temperature.

In order to provide an analog output from the monitor, a digital-to-analog converter 92 is provided. When selected by line 94, the converter converts serial data on line 96 to an analog output on line 98 corresponding to the tympanic temperature. This analog voltage is buffered by an analog buffer 87, and the buffer output Vtemp is made available to a user.

In accordance with another feature of this invention, the housing electronics comprises circuitry for providing the rate of change of ear canal or tympanic temperature. In certain medical situations, the rate of change of a subject's temperature is quite helpful. For example, patients often have allergic reactions to anesthesia which leads to a runaway metabolism condition causing the patient's temperature to increase rapidly. In these situations, the rate of change of tympanic temperature is a powerful early indication of the condition for a physician. To that end, a summing junction 160 sums the analog output voltage $E_{pc}$ from the preamplifier 74 and the analog voltage controlled by $R_a$. The analog output from the summing junction 160 is converted to a differential signal over time by a differential capacitor 95 and input to a variable gain amplifier 97. The amplifier scales the differential signal to an analog voltage corresponding to the rate of change of target temperature.

The variable gain amplifier 97 output signal is converted to a average rate of change based on the two user selectable time constants $s_1$ and $s_2$ which are determined by R111, C111 and R112, C112. Thus, the user selects the time period over which the rate of change of tympanic temperature is averaged by a depressing a switch 162. The position of the switch determines which time constant is employed. The output signal from the switch 162 is sent to an analog buffer 89 and the buffer output Vrate is made available to a user. An LED display is also provided to display the rate of change of tympanic temperature. To that end, the signal on line 99 is sent to an analog-to-digital (A/D) converter 101. A variable resistor R10, which is coupled to Vref, serves as a reference for the A/D converter 101. The A/D converter has a built-in 3½ digit LED display driver which drives the 3½ digit LED display 103. The LED display has three 7-segment LED displays and one 2-segment display. The individual segments within each display are controlled by the display driver.

Both calibration and characterization data required for processing by the microprocessor may be stored in an electrically erasable programmable read only memory (EEPROM) 100. The EEPROM may, for example, be a 93c46 sold by International CMOS Technologies, Inc. The data may be stored in the EEPROM by the microprocessor when the EEPROM is selected by line 102. Once stored in the EEPROM, the data is retained even after power down. Thus, though electrically programmable, once programmed the EEPROM serves as a virtually nonvolatile memory.

Prior to shipment, the EEPROM may be programmed through the microprocessor to store calibration data for calibrating the thermistor and thermopile. Further, characterization data which defines the personality of the infrared detector may be stored. For example, the same electronics hardware, including the microprocessor 75 and its internal program, may be used for a tympanic temperature detector in which the output is accurate in the target temperature range of about 60° F. to a 110° F. or it may be used as an industrial detector in which the target temperature range would be from about 0° F. to 100° F. Further, different modes of operation may be programmed into the system. For example, several different uses of the sound source 90 are available.

Figure 8:
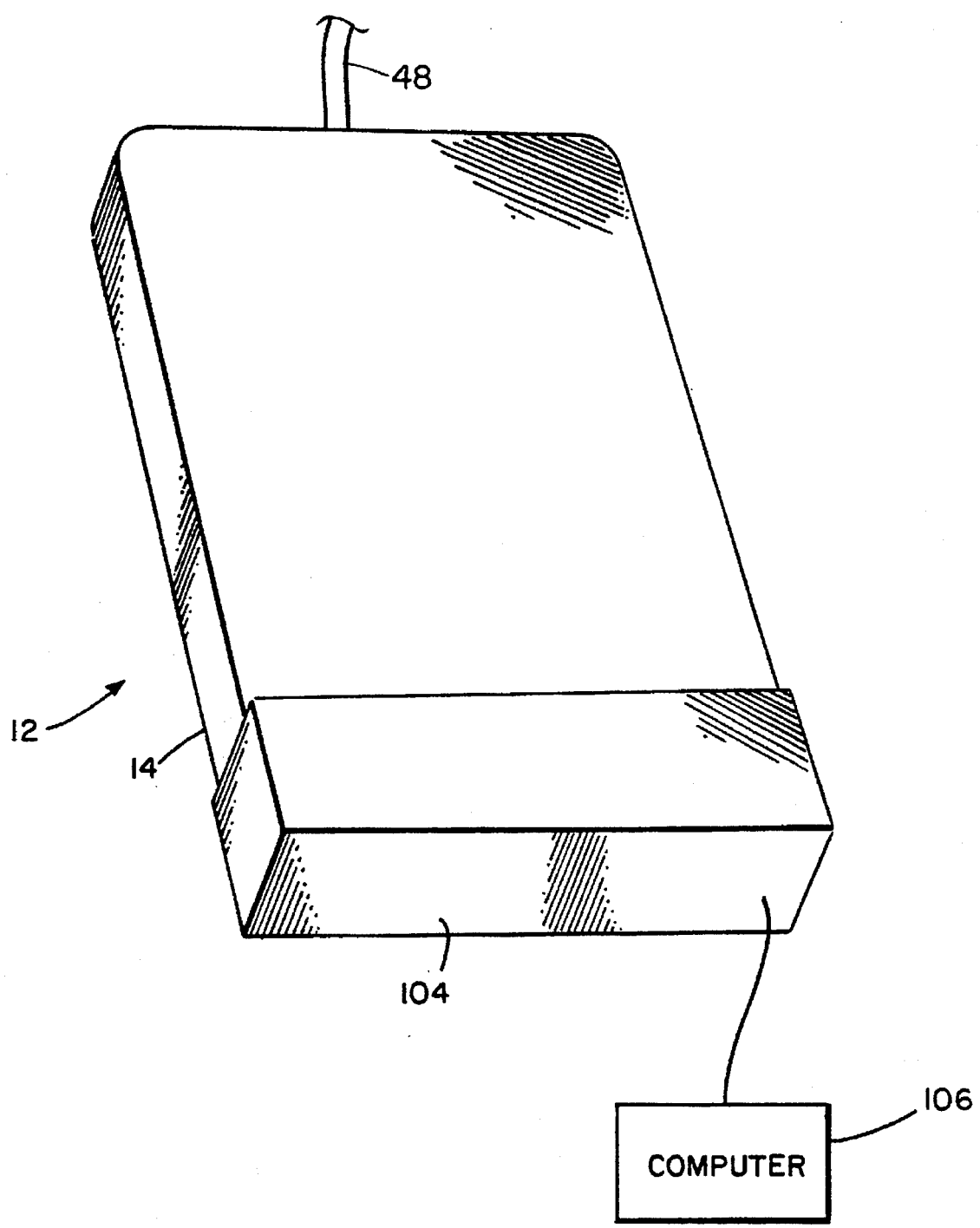
FIG. 8 illustrates a boot positioned on the housing of FIG. 1 during a calibration procedure.

Proper calibration of the detector is readily determined and the EEPROM is readily programmed by means of an optical communication link which includes a transistor T2 associated with the display. As illustrated in FIG. 8, a communication boot 104 may be placed over the end of the housing during a calibration/characterization procedure. A photodiode in the boot generates a digitally encoded optical signal which is filtered and applied to the detector T2 to provide an input to the microprocessor 75. In a reverse direction, the microprocessor, may communicate optically to a detector in the boot by flashing specific segments of the digital display 82. Through that communication link, an outside computer 106 can monitor the outputs from the thermistor and thermopile and perform a calibration of the devices. A unit to be calibrated is pointed at each of two black body radiation sources while the microprocessor 75 converts the signals and sends the values to the external computer. The computer is provided with the actual black body temperatures and ambient temperature in the controlled environment of the detector, computes calibration variables and returns those variable to be stored in the detector EEPROM. Similarly, data which characterizes a particular radiation detector may be communicated to the microprocessor for storage in the EEPROM.

A switch 113 may be provided either internally or through the housing to the user to set a mode of operation of the detector. By positioning the switch at either the lock position, the scan position or a neutral position, any of three modes may be selected. The first mode is the normal scan mode where the display is updated continuously. A second mode is a lock mode where the display locks after a selectable delay and then remains frozen until power is cycled or, optionally, the power-on button is pushed. The sound source may be caused to sound at the time of lock. The third mode is the peak mode where the display reads the maximum value found since power-on until power is cycled or, optionally, the power-on button is pushed.

The processor determines when the voltage from the divider R1, R2 drops below each of two thresholds. Below the higher threshold, the processor periodically enables the sound source to indicate that the battery is low and should be replaced but allows continued readout from the display. Below the lower threshold, the processor determines that any output would be unreliable and no longer displays temperature readings. The unit would then shut down upon release of the power button.

Figure 9A:
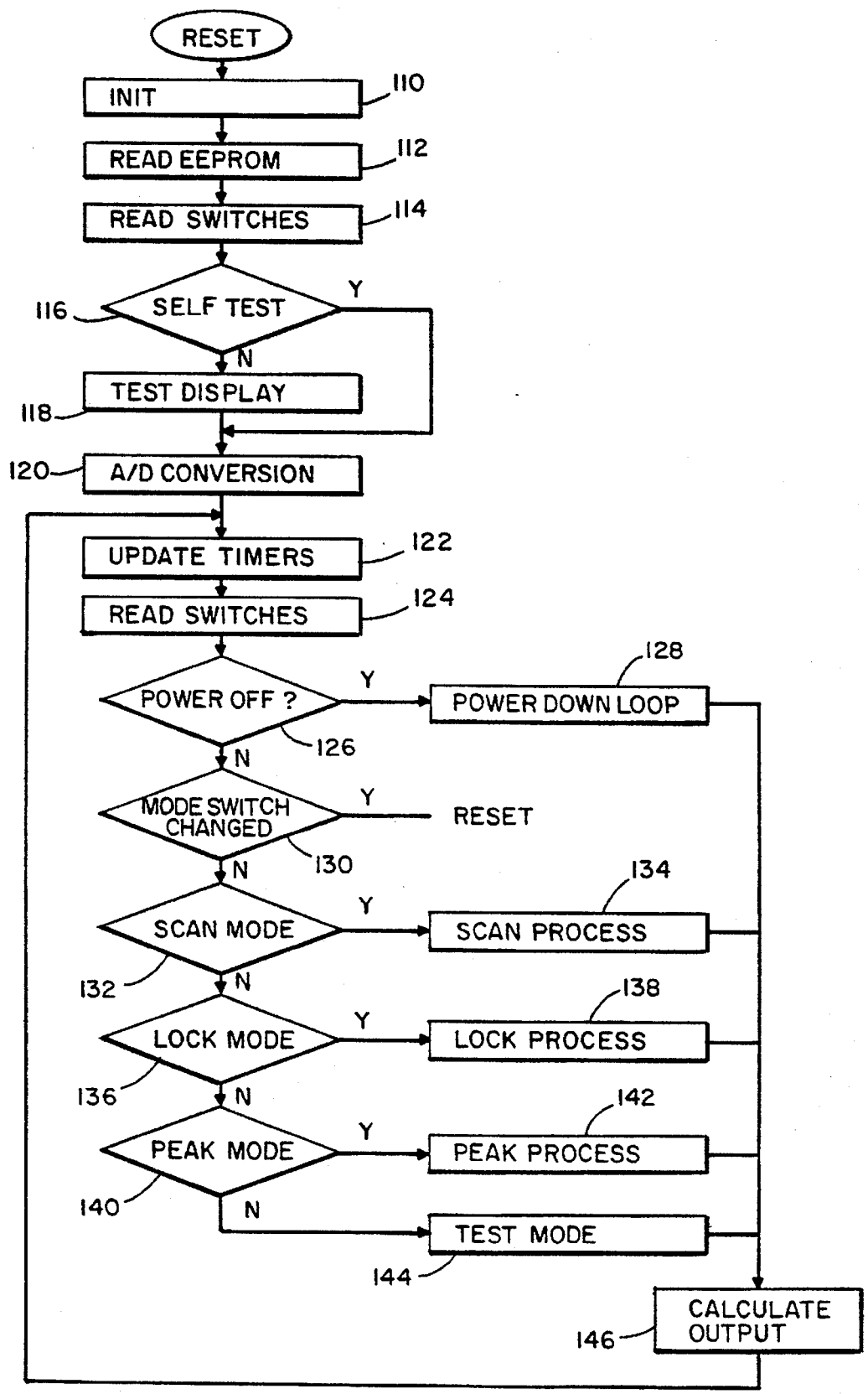
Figure 9C:
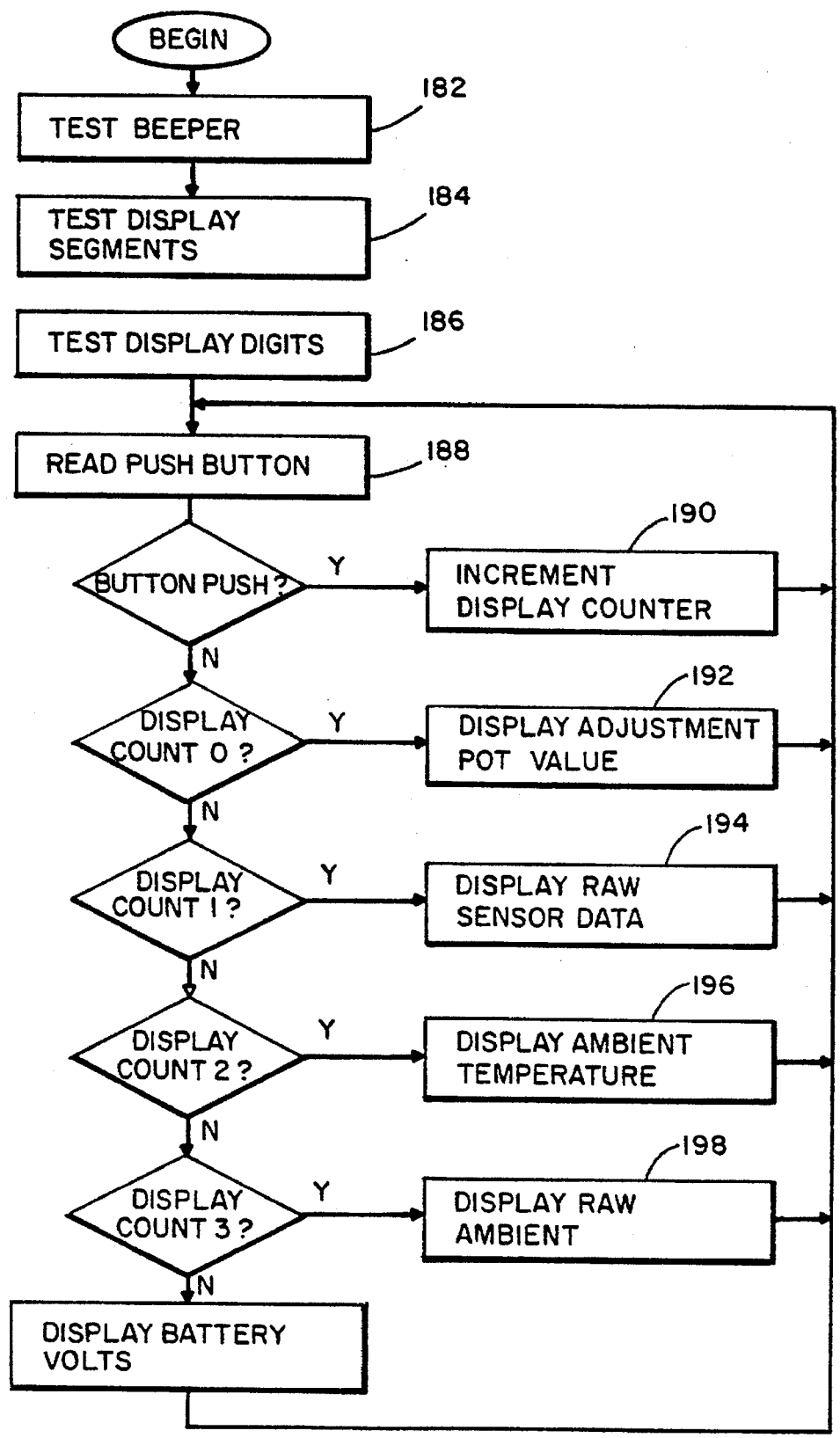

The following is a list of the information which may be contained in the EEPROM and therefore be programmable at the time of calibration:
  Radiation sensor offset
  Radiation sensor gain
  Radiation sensor temperature coefficient
  Thermistor offset
  Ambient temperature at calibration
  Thermistor lookup table
  Final temperature lookup table
  Adjustment factor F
  Sound source functions:
    Beep at button push in lock mode none/20/40/80 milliseconds long
    Beep at lock none/20/40/80 milliseconds long
    Beep at power down none/20/40/80 milliseconds long
    Beep at low battery none/20/40/80 milliseconds long interval 1/2/3 sec single/double beep
  Timeout functions:
    Time to power-down 0.5 to 128 sec in 0.5 sec increments
    Delay until lock 0.5 to 128 sec in 0.5 sec increments
  Other functions:
    Power-on button resets lock cycle
    Power-on button resets peak detect
    Display degrees C/degrees F
    EEPROM "Calibrated" pattern to indicate that the device has been calibrated
    EEPROM checksum for a self-check by the processor FIGS. 9A-9C provide a flowchart of the firmware stored in the microprocessor 75. From reset when the instrument is turned on, the system is initialized at 110 and the contents of the EEPROM are read into memory in the microprocessor at 112. At 114, the processor reads the state of power and mode switches in the system. At 116, the system determines whether a mode switch 113 has placed the system in a self-test mode. If not, all eights are displayed on the four-digit display 82 for a brief time. At 120, the system performs all A-to-D conversions to obtain digital representations of the thermopile output and the potentiometer settings through multiplexor 76.

The system then enters a loop in which outputs dictated by the mode switch are maintained. First the timers are updated at 122 and the switches are again read at 124. When the power is switched off, from 126 the system enters a power down loop at 128 until the system is fully down. At 130, the mode switch is checked and if changed the system is reset. Although not in the tympanic temperature detector, some detectors have a mode switch available to the user so that the mode of operation can be changed within a loop.

At 132, 136 and 140, the system determines its mode of operation and enters the appropriate scan process 134, lock process 138 or peak process 142. In a scan process, the system updates the output to the current reading in each loop. In a lock process, the system updates the output but locks onto an output after some period of time. In the peak process, the system output is the highest indication noted during a scan. In each of these processes, the system may respond to the programming from the EEPROM to perform any number of functions as discussed above. In the peak process which is selected for the tympanic temperature measurement, the system locks onto a peak measurement after a preset period of time. During assembly, the system may be set at a test mode 144 which will be described with respect to FIG. 9C. In any of the above-mentioned modes, an output is calculated at 146. Then the system loops back to step 122.

Analog-to-Digital conversion is performed periodically during an interrupt to the loop of FIG. 9A which occurs every two milliseconds. The interrupt routine is illustrated in FIG. 9B. Timer counters are updated at 170. A-to-D conversions are made from 172 only every 100 milliseconds when a flag has been set in the prior interrupt cycle. During most interrupts, an A/D conversion does not occur. Then, the 100-millisecond counter is checked at 174, and if the count has expired, a flag is set at 176 for the next interrupt. The flag is checked at 178 and, if found, the display is updated at 180. The system then returns to the main loop of FIG. 9A.

Where the 100 millisecond flag is noted at 172, an A-to-D conversion is to be performed. The system first determines at 182 whether a count indicates there should be a conversion of the thermopile output at 184 or a conversion of the thermistor output at 186. The thermopile sensor conversion is performed nine out of ten cycles through the conversion loop. At 188, the system checks to determine whether a conversion is made from the potentiometer R4 or from the battery voltage divider R1, R2 at 192. These conversions are made alternately.

FIG. 9C illustrates the self-test sequence which is called by the mode switch 113 only during assembly. During the test, the beeper sounds at 182 and all display segments are displayed at 184. Then the system steps each character of the display from zero through nine at 186. The system then enters a test loop. At 188, the system senses whether the button 108 has been pressed. If so, a display counter is incremented at 190. The display for the unit then depends on the count of the display counter. With the zero count, the adjustment potentiometer value is displayed at 192. Thereafter, if the display counter is incremented by pressing the button 108, the raw sensor data is displayed. With the next increment, ambient temperature is displayed at 196, and with the next increment, the raw output from the ambient temperature sensor RT1 is displayed. With the next increment, the battery voltage is displayed. After the test, the assembler sets the mode switch to the proper operating mode.

Figure 7A:
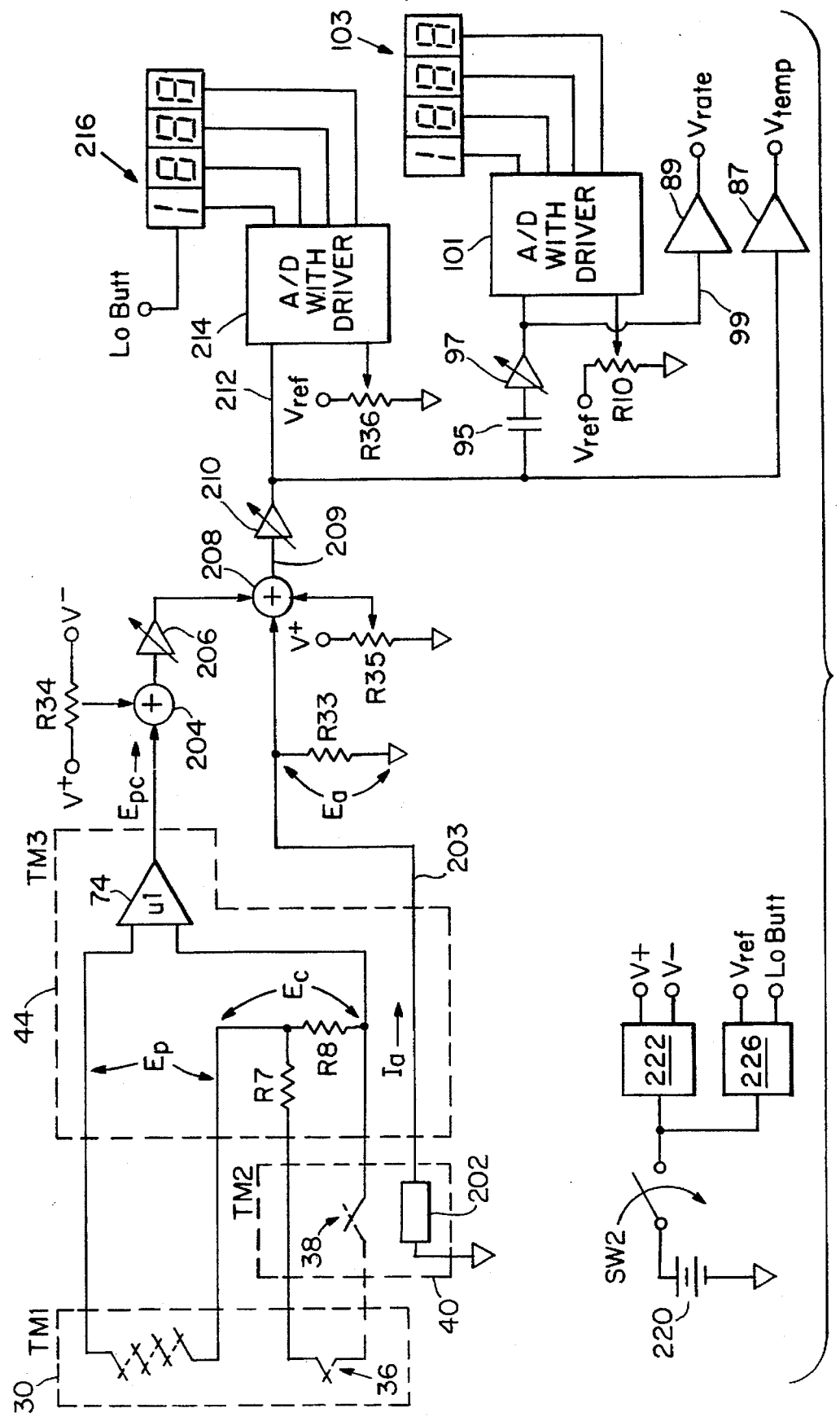
FIG. 7A is a schematic representation of an alternative implementation of the tympanic temperature electronics of FIGS. 5A and 5B.

An alternative embodiment of the tympanic temperature electronics is shown in FIG. 7A. In this simpler configuration, a microprocessor is not used and the thermistor of the preferred embodiment is replaced with an absolute temperature device 202. A battery 220 supplies power to the electronics. When the power-on switch SW1 is activated, a regulator unit 222 and a power processor unit 226 receive power from the battery. The regulator converts battery power into voltages V+ and V− which are used by the system electronics. Similarly, the power processor unit 226 generates a reference voltage Vref and a low battery voltage indication LO BATT.

The absolute temperature device 202 of this embodiment is a commercial device designated AD 592 which provides an output current corresponding to sensed ambient temperature in the plug structure. However, any linear device which monitors ambient temperature temperature is acceptable. The AD 592 produces an output current $I_a$ corresponding to the temperature of the mass 40 located in the plug structure. The output current $I_a$ drives a resistor R33 in the housing electronics producing a voltage output $E_a$ which is input to a summing junction 208.

The sensor output voltage $E_{pc}$ from the amplifier 74 is an input to a summing junction 204 located in the housing electronics. An adjustable offset voltage produced by a variable resistor R34 coupled to V+ and V− is a second input to the summing junction 204. Thus, the output voltage of the summing junction is $E_{pc}$ plus an offset voltage. This voltage is an input to a variable gain amplifier 206. This amplifier has an inherent offset which is cancelled by the offset voltage from R34. Thus, the amplifier output is simply an amplified $E_{pc}$.

Because the AD 592 provides ambient temperature information corresponding to a temperature in degrees Kelvin, a correction factor is required to convert to degrees Celsuis. To that end, a variable resistor R35 is coupled to V+ to generate a correction voltage which is the third input to the summing junction 208. The three input voltages are combined by the summing junction which generates an output voltage on line 209 which corresponds to the tympanic temperature. A variable gain amplifier 210 converts the voltage on line 209 to an analog voltage on line 212 which is compatible as an A/D converter input.

The analog voltage on line 212 is input to an A/D converter 214. A variable resistor R36 is coupled to Vref and serves as a reference for the A/D converter 214. A 3½ digit LED display driver is built into the A/D converter and drives the LED display 216. The display has four 7-segment LED displays for displaying tympanic temperature. The display driver controls all seven segments in three displays and two segments in the fourth display. All seven segments in the displays are also connected to the LO BATT indication. When the system battery 220 is low, the power processor generates a LO BATT voltage which lights all seven segments of the displays to inform a user that a new battery is required.

In order to provide an analog output from the monitor, the analog voltage on line 212 is connected to the analog buffer 87. The buffer output Vtemp is made available to a user.

The analog voltage on line 212 is manipulated to provide an analog voltage on line 99 which corresponds to the rate of change of tympanic temperature Vrate. As explained earlier, the analog voltage on line 99 is buffered an the buffer output is made available to a user. Additionally, the analog voltage on line 99 is converted to a digital signal which is displayed on the LED display 103.

Figure 7B:
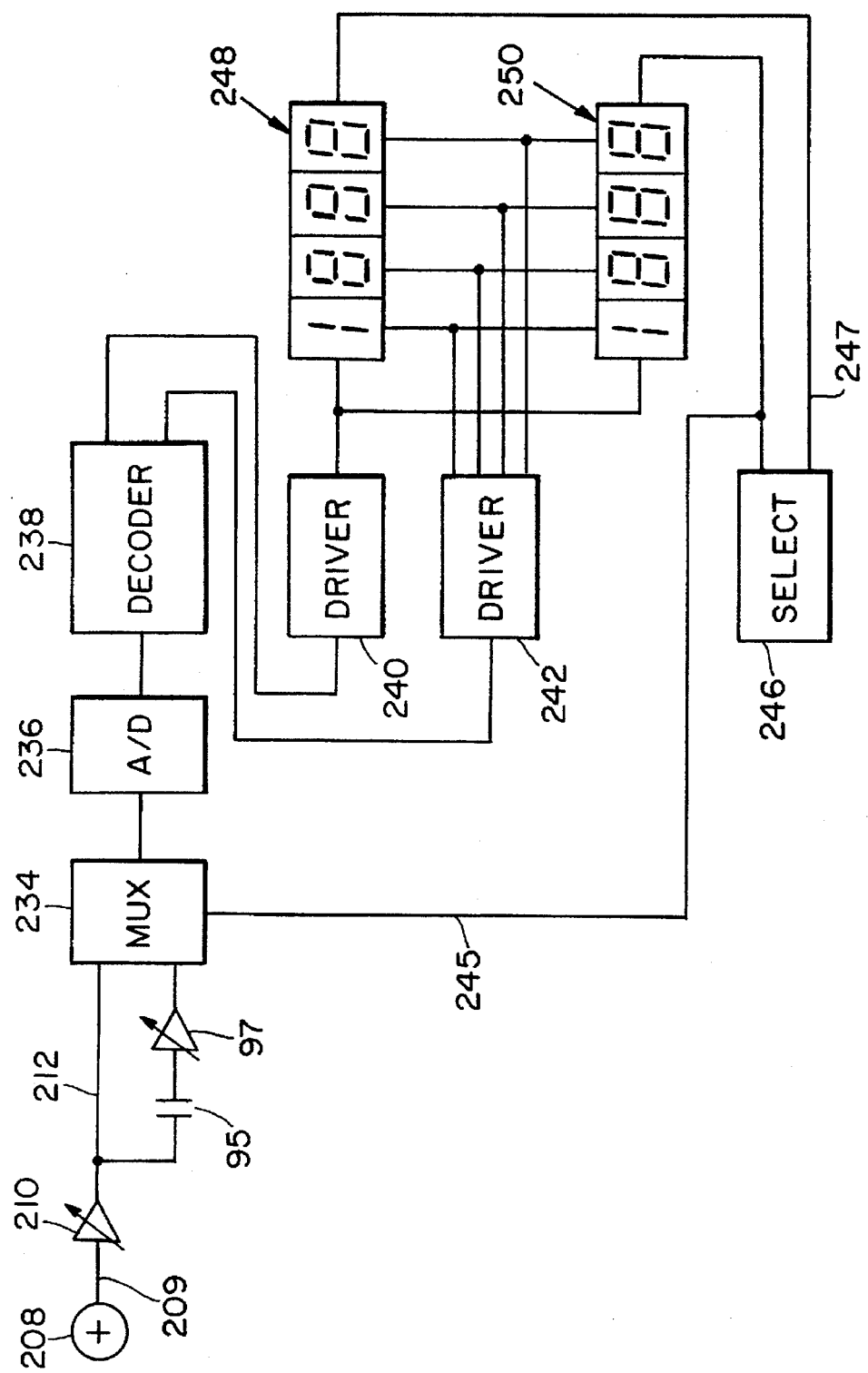
FIG. 7B is a schematic representation of an alternative display configuration of the display electronics of FIG. 7A.

An alternative configuration of the display circuitry of the above-described embodiment is shown in FIG. 7B. The analog voltage on line 212 corresponding to the tympanic temperature is an input to a multiplexer 234. Concurrently, the analog voltage on line 212 is converted to the rate of change of tympanic temperature which is also an input to the multiplexer. The multiplexer output may be controlled by a microprocessor (not shown) or a switching circuit (not shown). In either case, the multiplexer output may correspond to the voltage representing the tympanic temperature or the voltage representing the rate of change of the tympanic temperature. The A/D converter 236 converts the multiplexer output to a digital signal. This signal is an input to a decoder 238 which provides digital signals to a pair of LED display drivers 240 and 242.

The LED display drivers are connected to a pair of four-digit LED displays 248 and 249 which indicate the tympanic temperature and the rate of change of tympanic temperature respectively. The individual units of a four-digit display are selected sequentially by the column driver 242. Within each individual unit, the seven segments are controlled by the segment driver 240. The select circuit 246 ensures that only one display is enabled to accept signals from the drivers at a time. An output on line 245 from the multiplexer indicates which of the displays is to receive signals from the drivers. Thus, if the signal on line 245 enables the lower display 250 to accept signals from the drivers, the select circuit generates a signal which disables the upper display 248.

While this invention has been particularly shown and described with references to preferred embodiments thereof, it will be understood by those skilled in the art that various changes in form and details may be made therein without departing from the spirit and scope of the invention as defined by the appended claims.

We claim:

1. An ear canal temperature sensor comprising:
   a rigid structure of high thermal conductivity material;
   a thermopile having a hot junction and a cold junction and mounted to a film suspended across an opening in the rigid structure of high thermal conductivity material;

a window coupled to the rigid structure adjacent to the opening in the rigid structure;

a temperature sensor for sensing the thermopile cold junction temperature coupled to the rigid structure in close thermal contact with the cold junction of the thermopile;

a first layer of non-thermally conductive material covering the rigid structure;

a coating of electrically conductive paint covering the first layer of non-thermally conductive material; and a second layer of non-thermally conductive material covering the painted first layer of non-thermally conductive material.

2. A tympanic temperature sensor comprising:

a rigid structure of beryllium oxide having a film suspended across an opening in the rigid structure;

a thermopile having a hot junction and a cold junction and mounted on the film to view a tympanic membrane wherein the thermopile senses radiation emitted from a tympanic membrane and provides a first output signal indicative of the temperature of the tympanic membrane;

a thermocouple mounted on the rigid structure and in close thermal contact with the cold junction of the thermopile wherein the thermocouple provides a second output signal indicative of the temperature of the cold junction of the thermopile;

a window located at one end of the opening in the rigid structure and mounted on the rigid structure;

a first layer of non-thermally conductive material surrounding the rigid structure and providing thermal insulation to the rigid structure;

a coating of silver paint covering the first layer of non-thermally conductive material and providing electrical shielding to the rigid structure; and a second layer of non-thermally conductive material surrounding the silver painted first layer of non-thermally conductive material and providing additional thermal insulation to the rigid structure.

3. A method for monitoring tympanic temperature comprising:

providing a radiation detector adapted to fit into an ear canal and having a thermopile with a hot junction and a cold junction wherein the thermopile is mounted to view a tympanic membrane, a thermocouple having a hot junction and a cold junction wherein the hot junction of the thermocouple is in close thermal contact with the cold junction of the thermopile, a plug structure from which the radiation detector extends into the ear canal and molded to fit in the concha region of an ear, a second temperature sensor mounted within the plug structure, and a flexible extension connecting the radiation detector to the plug structure;

inserting the radiation detector into the ear canal with the plug structure seated in the concha region of the ear;

sensing the tympanic temperature with the thermopile wherein the thermopile generates a first output signal indicative of the temperature of the tympanic membrane;

sensing the cold junction temperature of the thermopile with the thermocouple wherein the thermocouple generates a second output signal indicative of the temperature differential between the cold junction of the thermopile and the plug structure;

sensing the temperature of the plug structure with the second sensor wherein the second sensor generates a third output signal indicative of the temperature in the plug structure;

combining the first, second and third output signals to produce a total output signal; and converting the total output signal to a tympanic temperature indication.

4. A method for monitoring tympanic temperature as claimed in claim 3 wherein the plug structure comprises electronics for combining the first and second output signals to produce a total output signal.

5. A method for monitoring tympanic temperature as claimed in claim 4 further comprising:

providing electronics located in the plug structure and a remote housing for receiving the total output signal and the third output signal and having a display mounted in the remote housing;

combining the total output signal and the third output signal to produce a combined output signal and converting the combined output signal into a tympanic temperature in the remote housing; and displaying the tympanic temperature on the display.

6. An ear canal temperature monitor comprising:

a radiation detector mounted to view a tympanic membrane;

an adapter shaped to fit in the concha region of an ear;

an ear-piece shaped to fit behind the ear; and an extension at least 8 mm in length connecting the radiation detector with the ear-piece;

wherein the adapter is positioned along the extension such that separation between the adapter and the radiation detector is adjustable.

7. An ear canal temperature monitor as claimed in claim 6 wherein the extension is a flexible member which deflects upon insertion to the ear canal to conform to the contours therein.

8. An ear canal temperature monitor as claimed in claim 6 wherein range of separation between the adapter and the radiation detector is from eight to nineteen millimeters.

9. An ear canal temperature monitor as claimed in claim 8 wherein the radiation detector comprises:

a rigid structure of high thermal conductivity material;

a thermopile mounted to a film suspended across an opening in the rigid structure of high thermal conductivity material;

a window mounted on the rigid structure over one end of the opening in the rigid structure; and a temperature sensor for sensing the cold junction temperature of the thermopile mounted on the rigid structure in close thermal contact with a junction of the thermopile.

10. An ear canal temperature monitor as claimed in claim 6 further comprising a removable plastic sheet stretched over the radiation detector, the extension and the adapter.

11. An ear canal temperature monitor comprising:

a radiation detector which comprises a thermopile with a hot junction and a cold junction wherein the thermopile senses the radiation emitted by a tympanic membrane and provides a first output signal indicative of the temperature of the tympanic membrane and a first temperature sensor which senses the temperature of the cold junction of the thermopile and provides a second output signal indicative thereof;

an adapter shaped to fit in the concha region of an ear;

an ear-piece shaped to fit behind the ear and which comprises electronics for combining the first and second output signals and a second temperature sensor for providing a third output signal indicative of the temperature within the ear-piece;

a flexible extension which conforms to the contours of the ear canal and which fits through the hollow adapter to connect the radiation detector with the ear-piece, wherein the adapter is positioned along the flexible extension such that separation between the adapter and the radiation detector is adjustable with a maximum separation of nineteen millimeters; and a remote housing unit which comprises additional electronics for combining the first, second and third output signals to produce an ear canal temperature indication.

12. A method for monitoring ear canal temperature comprising:

providing a radiation detector mounted to view a target, a plug structure shaped to fit in the concha region of an ear, an ear-piece having electronics and shaped to fit behind the ear, and a flexible extension which fits through the plug structure and connects the radiation detector and the ear-piece;

inserting the radiation detector into an ear canal wherein the radiation detector views the tympanic membrane, the flexible extension conforming to the contours of the ear canal and the ear-piece fitting behind the ear to prevent the remote assembly from backing out of the ear canal;

sensing the radiation in the ear canal emitted by the tympanic membrane with the radiation detector; and converting the sensed radiation to ear canal temperature.

13. A method for monitoring ear canal temperature as claimed in claim 12 further comprising adjusting the position of the plug structure on the extension to provide a distance of separation of less than nineteen millimeters between the plug structure and the radiation detector.

14. A method for monitoring the rate of change of ear canal temperature comprising:

providing a radiation detector mounted to view a target, a plug structure shaped to fit in the concha region of an ear, an ear-piece having electronics and shaped to fit behind the ear, and an extension connecting the radiation detector and the ear-piece;

inserting the radiation detector into an ear canal wherein the radiation detector views the tympanic membrane, the extension being shaped to conform to the contours of the ear canal and the ear-piece fitting behind the ear to prevent the remote assembly from backing out of the ear canal;

sensing the radiation in the ear canal emitted by the tympanic membrane with the radiation detector; and converting the sensed radiation to a rate of change of ear canal temperature.

15. A method for monitoring the rate of change of ear canal temperature as claimed in claim 14 further comprising adjusting the position of the plug structure on the extension to provide a distance of separation of less than nineteen millimeters between the plug structure and the radiation detector.

* * * * *